US012781968B2

(12) United States Patent
Witzel et al.

(10) Patent No.: US 12,781,968 B2
(45) Date of Patent: Nov. 3, 2026

(54) SYSTEM, METHOD AND DEVICE FOR TEMPERATURE CONTROL OF GAS COOKING APPARATUS

(71) Applicant: Onward Multi-Corp Inc., Waterloo (CA)

(72) Inventors: Theodore Andrew Witzel, Waterloo (CA); Colin Kirvan, Waterloo (CA); Benjamin Harrison, Waterloo (CA); Kiel Webb, Waterloo (CA)

(73) Assignee: Onward Multi-Corp Inc., Waterloo (CA)

( * ) Notice: Subject to any disclaimer, the term of this patent is extended or adjusted under 35 U.S.C. 154(b) by 667 days.

(21) Appl. No.: 17/840,459

(22) Filed: Jun. 14, 2022

(65) Prior Publication Data

US 2023/0088726 A1 Mar. 23, 2023

Related U.S. Application Data

(60) Provisional application No. 63/210,565, filed on Jun. 15, 2021.

(51) Int. Cl.

*F24C 3/12* (2006.01)
*A47J 37/07* (2006.01)
(Continued)

(52) U.S. Cl.

CPC ........... *F24C 3/126* (2013.01); *A47J 37/0713* (2013.01); *F23N 1/002* (2013.01); *G05D 23/22* (2013.01);
(Continued)

(58) Field of Classification Search

None
See application file for complete search history.

(56) References Cited

U.S. PATENT DOCUMENTS 821,758 A * 5/1906 Smith ........................ F16K 1/46 251/368
1,051,369 A * 1/1913 Heath ..................... F02M 29/02 123/593

(Continued)

FOREIGN PATENT DOCUMENTS

BR 102013025440 A2 * 8/2015 ................ F24C 5/16

OTHER PUBLICATIONS

Portuguese to English machine translation of BR-102013025440-A2.*

*Primary Examiner* — Michael G Hoang
*Assistant Examiner* — Elizabeth Ann Laughlin
(74) *Attorney, Agent, or Firm* — Smart & Biggar LP

(57) ABSTRACT

According to one aspect, a cooking apparatus having a main fuel manifold that provides fuel to at least one manual burner and at least one control valve, and at least one controlled fuel manifold in fluid communication with the at least one control valve, each controlled fuel manifold for providing fuel to at least one controlled burner. The cooking apparatus also includes at least one thermocouple, each thermocouple monitoring at least one measured temperature within the cooking apparatus. The cooking apparatus also includes an input device for receiving a desired temperature set-point. The cooking apparatus also includes a controller having a microprocessor operable to compare the at least one measured temperature and the temperature set-point. In response to the comparison, the controller will selectively adjust the at least one control valve to restrict an amount of fuel flowing to the at least one controlled fuel manifold.

18 Claims, 16 Drawing Sheets

(51) Int. Cl.
*F23N 1/00* (2006.01)
*G05D 23/22* (2006.01)

(52) U.S. Cl.
CPC ...... *F23N 2225/08* (2020.01); *F23N 2235/16* (2020.01)

(56) References Cited

U.S. PATENT DOCUMENTS

| | | | | | |
|---|---|---|---|---|---|
| 5,536,518 | A * | 7/1996 | Rummel | A47J 37/074 | 126/41 R |
| 6,082,397 | A * | 7/2000 | Casolari | F16L 41/025 | 137/561 A |
| 6,363,971 | B1 * | 4/2002 | Kaylan | F23N 1/005 | 251/248 |
| 2007/0044786 | A1 * | 3/2007 | Frost | F24C 3/126 | 126/39 N |
| 2009/0183729 | A1 * | 7/2009 | Barkhouse | G05D 23/22 | 126/39 BA |
| 2010/0132692 | A1 * | 6/2010 | Shaffer | A47J 37/0713 | 99/333 |
| 2011/0074150 | A1 * | 3/2011 | Drost | F01N 13/1811 | 285/364 |
| 2017/0097159 | A1 * | 4/2017 | Jackson | F24C 3/02 | |
| 2018/0084946 | A1 * | 3/2018 | Gafford | A47J 37/0786 | |
| 2024/0000266 | A1 * | 1/2024 | Burch | F23N 1/007 | |

* cited by examiner

SYSTEM, METHOD AND DEVICE FOR TEMPERATURE CONTROL OF GAS COOKING APPARATUS

CROSS-REFERENCE TO RELATED APPLICATIONS

This application claims the benefit of U.S. Provisional Patent Application No. 63/210,565, filed Jun. 15, 2021. The entire contents of U.S. Provisional Patent Application No. 63/210,565 is incorporated herein by reference for all purposes.

FIELD

This disclosure relates generally to systems, methods and devices for temperature control of cooking apparatus, particularly gas cooking apparatus such as for example a grill, barbeque, or fryer, as well as heating apparatus such as a heater, patio heater, fireplace, fire pit or bowl, or any other apparatus that includes a gas energy source that may be controlled.

INTRODUCTION

The following is not an admission that anything discussed below is part of the prior art or part of the common general knowledge of a person skilled in the art.

Traditionally, barbecues, grills and other cooking or heating apparatus have not included means for automatically managing the temperature of the energy output. Instead, for example, control of temperature in a cooking apparatus is often managed manually by observation or sensing a temperature state of the apparatus (in some cases by manual inspection of a thermometer), and then manually adjusting the temperature to attempt to achieve a particular desired temperature.

BRIEF DESCRIPTION OF THE DRAWINGS

For a better understanding of the described embodiments and to show more clearly how they may be carried into effect, reference will now be made, by way of example, to the accompanying drawings in which.

Figure 1:
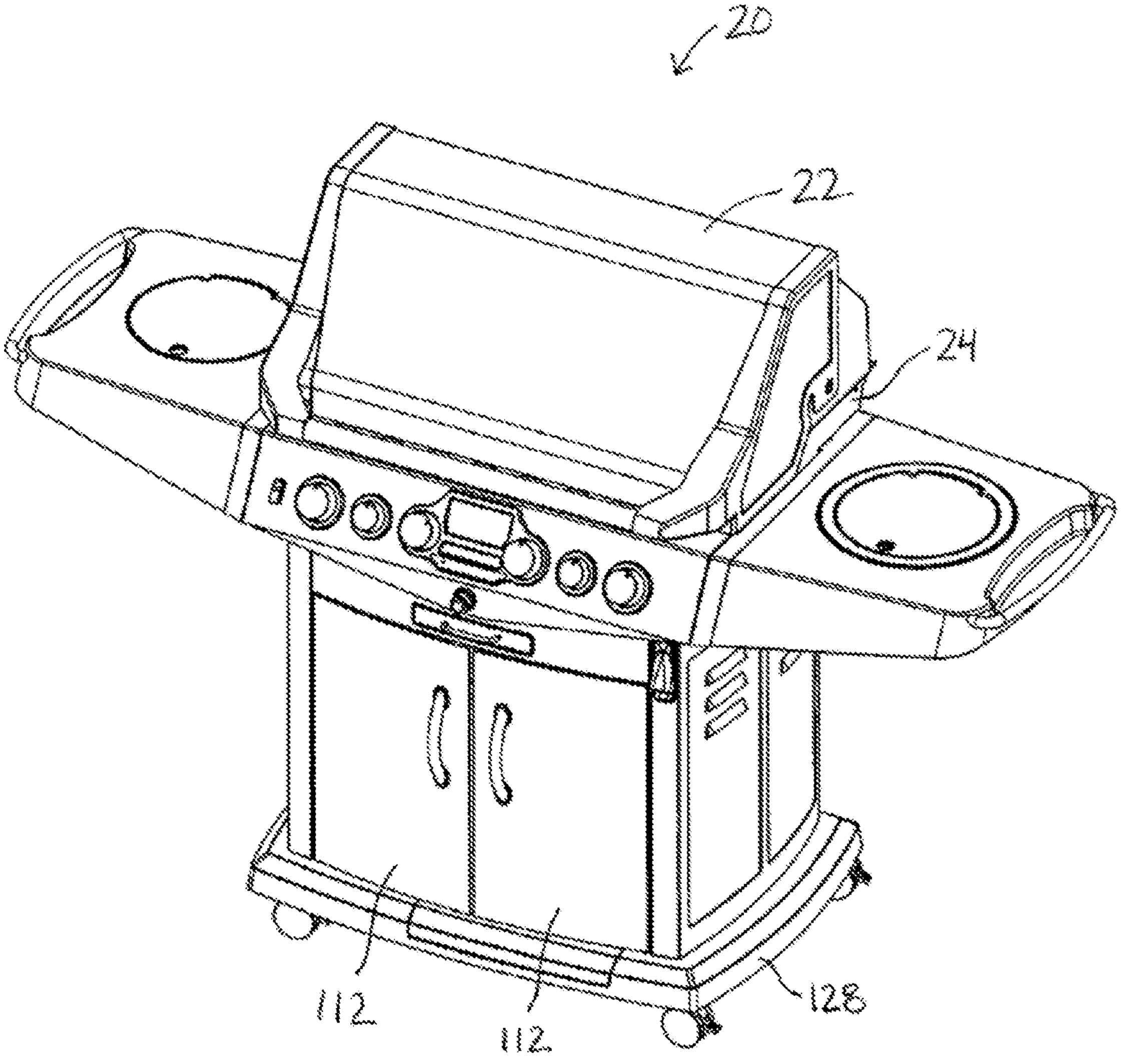
FIG. 1 is a perspective view of a cooking apparatus according to one embodiment.

The drawings included herewith are for illustrating various examples of articles, methods, and apparatuses of the teaching of the present specification and are not intended to limit the scope of what is taught in any way.

DESCRIPTION OF VARIOUS EMBODIMENTS

Various apparatuses will be described below to provide an example of one or more embodiments. No embodiment described below limits any claims and any claims may cover apparatuses that differ from those described below. The claims are not limited to apparatuses, methods or systems having all of the features of any one apparatus, method, or system described below or to features common to multiple or all of the apparatuses, methods and systems described below.

It is possible that an apparatus, system or method described herein is not an embodiment of any claim. Any embodiment disclosed herein that is not claimed in this document may be the subject matter of another protective instrument, for example, a continuing patent application, and the applicants, inventors or owners do not intend to abandon, disclaim or dedicate to the public any such embodiment merely by its disclosure in this document.

The terms “including”, “comprising”, and variations thereof mean “including but not limited to”, unless expressly specified otherwise. A listing of items does not imply that any or all of the items are mutually exclusive, unless expressly specified otherwise. The terms “a”, “an”, and “the” mean “one or more”, unless expressly specified otherwise.

As used herein and in the claims, two or more parts are said to be “coupled”, “connected”, “attached”, “mounted” or “fastened” where the parts are joined or operate together either directly or indirectly (i.e., through one or more intermediate parts), so long as a link occurs. As used herein and in the claims, two or more parts are said to be “directly coupled”, “directly connected”, “directly attached”, or “directly fastened” where the parts are connected in physical contact with each other. As used herein, two or more parts are said to be “rigidly coupled”, “rigidly connected”, “rigidly attached”, or “rigidly fastened” where the parts are coupled so as to move as one while maintaining a constant orientation relative to each other. None of the terms “coupled”, “connected”, “attached”, “mounted”, and “fastened” distinguish the manner in which two or more parts are joined together.

Some elements herein may be identified by a part number, which is composed of a base number followed by an alphabetical or subscript-numerical suffix (e.g., 112*a*, or 1121). Multiple elements herein may be identified by part numbers that share a base number in common and that differ by their suffixes (e.g., 1121, 1122, and 1123). Elements with a common base number may in some cases be referred to collectively or generically using the base number without a suffix (e.g., 112).

It should be noted that terms of degree such as "substantially", "about", and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

It should also be noted that, as used herein, the wording "and/or" is intended to represent an inclusive-or. That is, "X and/or Y" is intended to mean X or Y or both X and Y, for example. As a further example, "X, Y, and/or Z" is intended to mean X or Y or Z or any combination thereof of X, Y, and Z.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

GENERAL DESCRIPTION

In some examples, similar references may be used in different figures to denote similar components.

As discussed herein, one or more temperature control apparatus, methods and systems may facilitate control of an internal temperature of a gas-fueled cooking apparatus or other appliance, such as an outdoor gas barbeque. Alternatively, the apparatus may be employed to facilitate the control of energy output of any gas fueled energy generation device such as a heater or fireplace.

The description herein is made in the general context of gas fueled barbeques, but the disclosed temperature control apparatus may be applied to any manner of appliance, including gas fueled appliances such as stoves, fireplaces, fire pits, heaters, and fryers.

In general, temperature control apparatus, systems and methods as described herein may permit a user to input a desired temperature set-point. The temperature control apparatus then automatically controls the flow rate of gas into at least some portions of the barbeque to achieve the desired temperature. This may permit greater precision in the cooking of food with a gas fueled appliance.

For example, more accurate and automatic temperature control may permit a barbeque to be used to bake, in addition to a more traditional grilling of meat. Even the grilling of meat may be improved given that an operator or user has the assistance of at least a somewhat automated control of the temperature within the barbeque.

Such greater diversity of food that may be cooked with a barbeque may have certain advantages, such as encouraging barbecues to be used for cooking a greater variety of foods using various techniques including grilling and searing by the direct method, and slow smoking and roasting by the indirect method.

Turning now to FIG. 1, illustrated therein is a cooking apparatus according to one example, such as a typical barbeque 20. Barbeque 20 may include a lid 22 mounted to a base 24.

Figure 2:
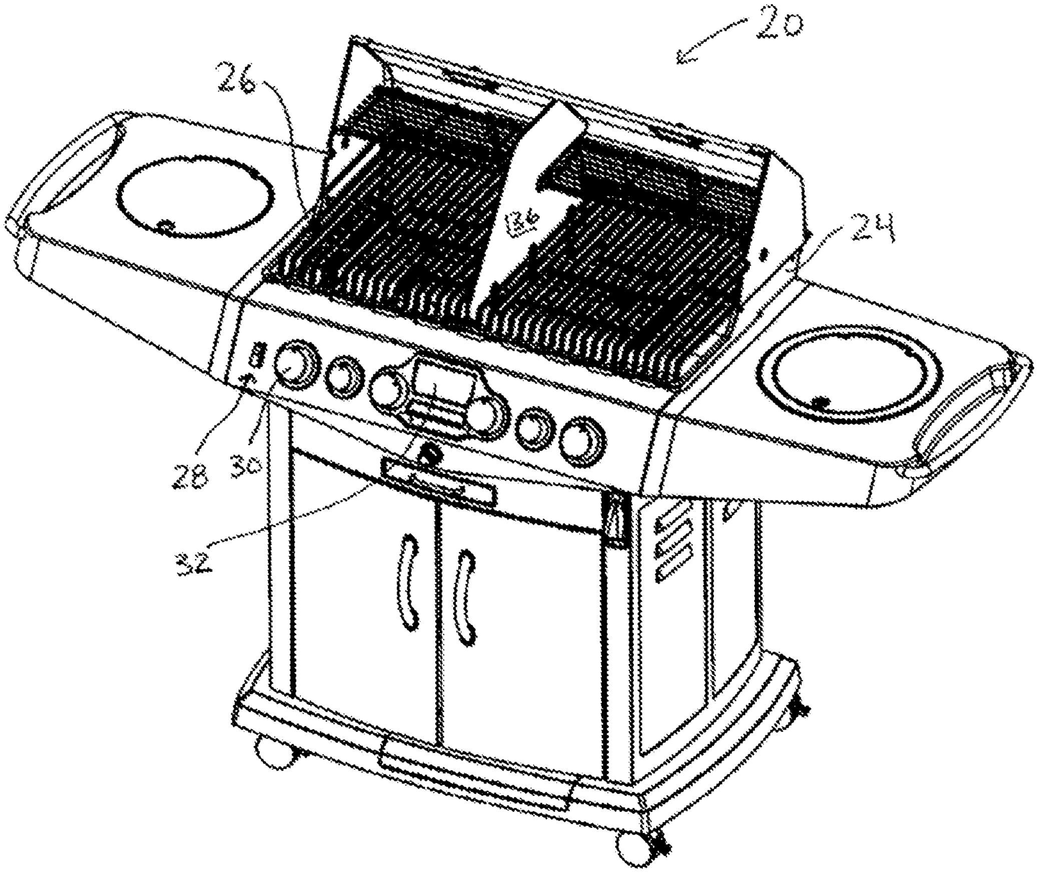
FIG. 2 is a perspective view of the cooking apparatus of FIG. 1 with the lid removed.

In FIG. 2, the barbeque 20 is shown having lid 22 removed for illustration purposes. Base 24 supports a grill 26. Grill 26 may be used to directly support food for cooking, or indirectly via cooking vessels (not shown) containing food for cooking. The particular configuration of the grill base 24 and lid 22 may be modified without materially affecting the operation of the temperature control apparatus as will be described herein. In some embodiments, one or more portions of the grill 26 may even be eliminated or removed during cooking.

Barbeque 20 may also include a console 28 which may be mounted about base 24. Console 28 may be used to support one or more control knobs 30, for manual control of associated valves, and which may be part of a temperature control apparatus 32.

In some cases, it may not be necessary that temperature control apparatus 32 be integrally mounted to barbeque 20 via console 28, or to any other feature of the barbeque. The temperature control apparatus 32 may, for example, simply be placed upon any suitable part of barbeque 20 and connected to barbeque 20 as described herein. Hence, in some cases a temperature control apparatus 32 may be used to modify existing barbeques to provide temperature control as described herein (i.e., in a retrofit application). Alternatively, temperature control apparatus 32 may be integrated with a particular barbeque, such as a barbeque 20 described above.

Figure 3:
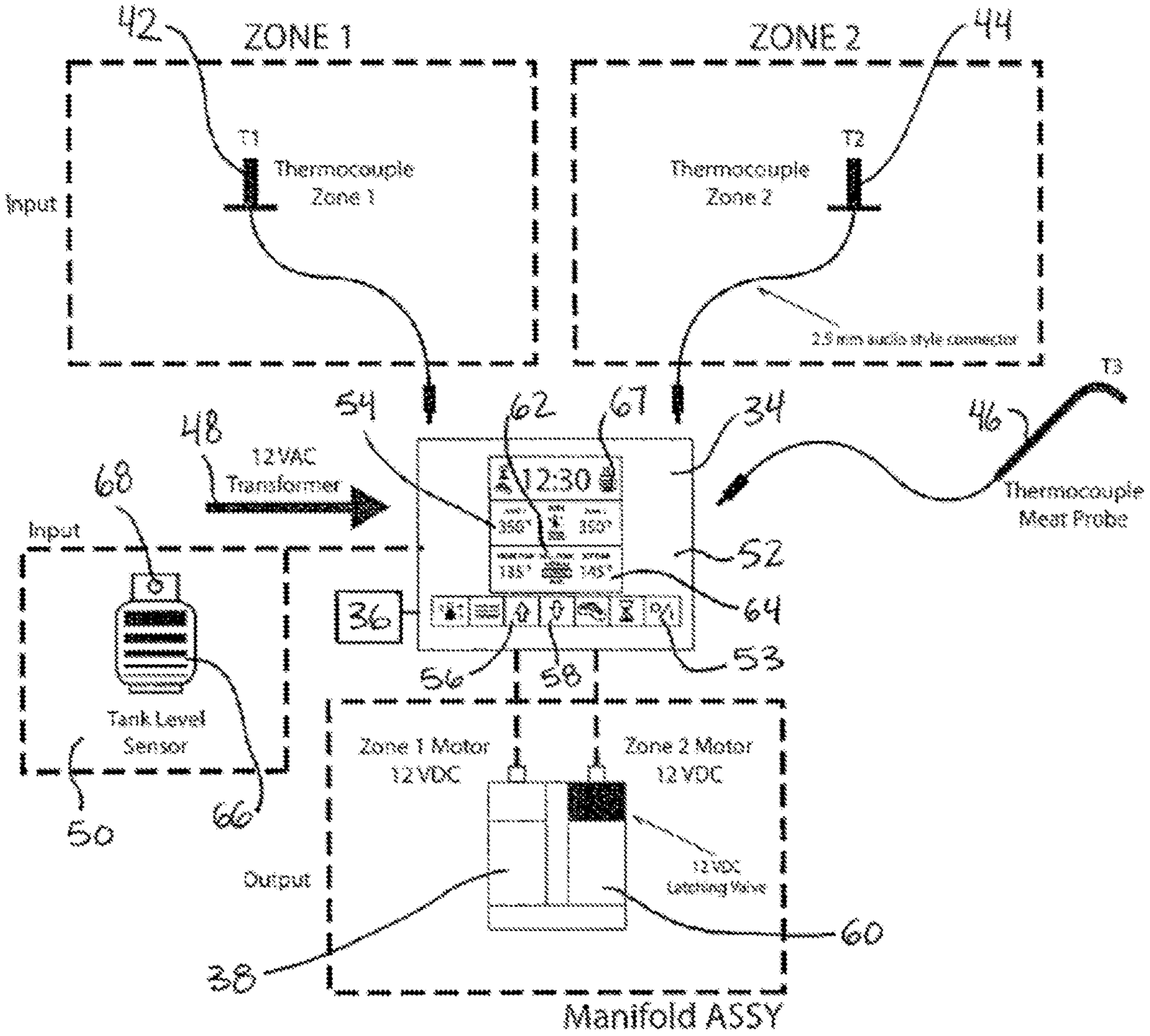
FIG. 3 is a schematic diagram of components included in a temperature control apparatus for the cooking apparatus of FIG. 1.

Turning now to FIG. 3, illustrated therein is a schematic overview of the temperature control apparatus 32 according to one example. Many of the components described herein may be substituted by suitable components that are functionally similar. Temperature control apparatus 32 may include an input device 34. As shown, the input device 34 may be a touch sensitive LCD screen, but may alternatively include some other suitable input device, such as a keypad or dial(s).

Temperature control apparatus 32 also includes a microprocessor 36. Microprocessor 36 may be electrically connected to input device 34 for receiving input from a user. Microprocessor 36 is also operatively connected to at least one valve 38. Valve 38 may be any type of electrically or mechanically controlled valve suitable for changing the flow of a gas. In the present embodiment, valve 38 is an electrically controlled valve. In some cases the valve 38 may be adjustable to provide a plurality of flow rates therethrough. In particular, in some examples the valve 38 may be capable of providing a continuous range of flow rates therethrough. In other cases, the valve 38 may be operable to provide discrete flow rates (i.e., high flow or low flow).

In some cases valve 38 may be a latching or latch valve. A latch valve having at least two settings, being open and closed or high and low-flow, may be used either in place of or in addition to, another latch valve or a different type of valve such as a solenoid valve. In some cases, a latch valve having a high and low-flow setting be used, as will be explained below.

The latch valve advantageously requires power to change from one setting (e.g., high) to another (e.g., low), but typically does not require power to maintain any particular setting. This may advantageously reduce the amount of power required for the temperature control apparatus 32. This characteristic may be particularly useful if the temperature control apparatus is powered by a battery (not shown) or other portable or limited power supply. If power supply is lost or runs out, then in some examples a capacitor (not shown) may be included in temperature control apparatus 32 to enable the latch valve to be switched one (or more) times in or to put it in a desired flow state. For example, if power is lost when the latch valve is in a low flow state, the capacitor may be used to switch it to a high flow state so that barbeque 20 may be then used as a conventional barbeque.

Figure 4A:
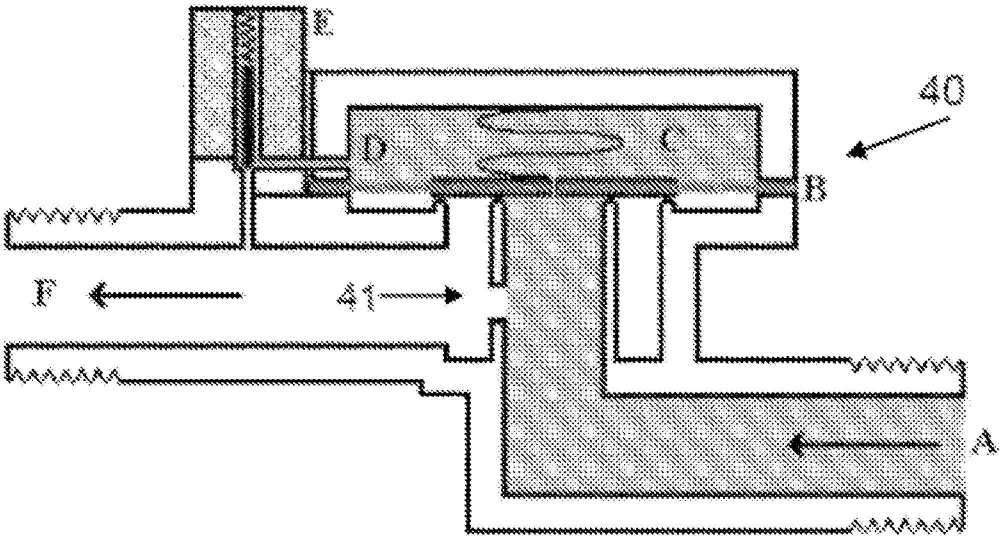
FIG. 4A is a cross-sectional view of an exemplary solenoid valve of the temperature control apparatus of FIG. 3 shown in a closed position.
Figure 4B:
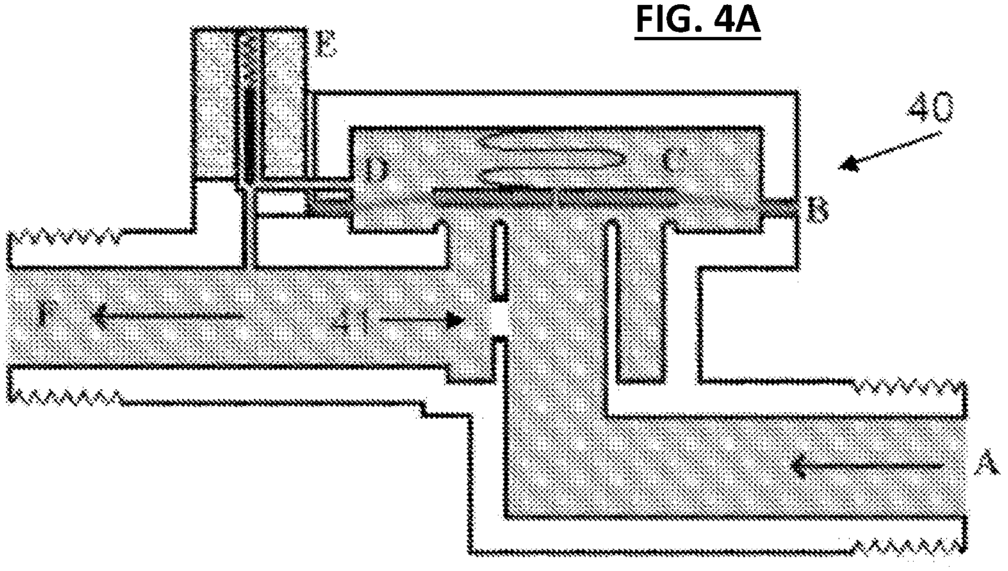
FIG. 4B is a cross-sectional view of the solenoid valve of FIG. 4A shown in an open position.

Alternatively in some cases valves such as solenoid valve 40, as shown in FIGS. 4A and 4B, may be used. Any suitable solenoid valve may also be used, and not just the valve illustrated in FIGS. 4A and 4B. FIG. 4A shows solenoid valve in a closed position. FIG. 4B shows the solenoid valve in an open position.

Valve 40 may have an opening 41 to encourage a low flow rate when the valve is "closed". In an embodiment, solenoid valve 40 is switchable between at least a low-flow rate and a high-flow rate. A solenoid valve may be less suitable for uses where power is at a premium because a solenoid valve typically requires power to maintain the valve in at least one of its flow states. This may cause a draw on power, such as battery power.

However, if the solenoid valve requires power to enter a low flow rate, then when power is lost, it may automatically revert to a high flow rate, enabling barbeque 20 to be used as a conventional barbeque, without the need for additional power or a capacitor.

Valves such as 38 and 40 may alternatively include two valve mechanisms within a single unit, which may provide a more cost effective and/or compact arrangement when more than one valve is employed.

Referring again to FIG. 3, microprocessor 36 may be operatively connected to a thermocouple, such as thermocouple 42. Additional thermocouples may be used, as needed. For example, if temperature control apparatus 32 described above is used to control the temperature of more than one barbeque, or more than one area or zone within a given barbeque, then multiple thermocouples may be used.

Additionally, multiple thermocouples may be used to obtain a more accurate reading within a single barbeque enclosure. In one embodiment just a single valve may be used to control temperature in a single barbeque enclosure or zone.

In the embodiment shown, a second thermocouple 44 is employed so that temperature control apparatus 32 may be used to control the temperature within two different zones of barbeque 20 as described in further detail below. Optionally, an additional thermocouple, such as meat probe 46 may be connected to microprocessor 36 to permit the monitoring of the temperature of a food, such as meat being cooked within barbeque 20.

Temperature control apparatus 32 may receive power from a power supply 48. Power supply 48 may provide 12 volts AC. Temperature control apparatus 32 may also be configured to run on some other suitable voltage, including DC current, provided that suitable circuitry is included with temperature control apparatus 32 to accept such power. Using DC power may permit a battery or other portable form of power to be used. Typically, a 120 volt AC power supply is used and is then converted by a transformer to 12 volt AC power.

Microprocessor 36 may accept other inputs such as from a tank level sensor 50. Tank level sensor 50 provides a signal to microprocessor 36 to indicate the level of a connected fuel supply, which may be used to calculate the time remaining before additional fuel is needed either at the current fuel usage rate, an average fuel usage rate, or some other appropriate measure. This may done by monitoring the rate of change over time and predicting (extrapolating) the time when the tank will be out of fuel. If another gas source is used, for example from a natural gas line, then the tank sensor functionality may be removed.

The various connections between the components of the temperature control apparatus 32 may in general be wired or wireless (such as a Bluetooth or Zigbee connection), and may include standard connectors, such as 2.5 millimeter audio style connectors, or may be hard-wired or use some other connection, as desired.

Input device 34 may have any of a number of suitable configurations as noted. At its simplest, input device 34 may be a dial, switch or lever that may be moved to select a higher or lower desired temperature for the barbeque 20.

In the illustrated embodiment, input device 34 includes an LCD screen 52 that may be backlit (or may have a sensor or timer to limit or eliminate the amount of back light in order to conserve power, if needed). LCD screen 52 may be touch sensitive, or may be activated using some other input device such as a keypad, a keyboard, a light pen, a mouse, or some other device. The particular layout and style of the graphics for the interface of LCD screen 52 may be configured as needed. No particular layout is required. Aside from the functionality to input a set-point temperature, all other functionality is optional. However, some configurations, such as those described herein, may facilitate inputs to be made and readings to be displayed.

The temperature control apparatus 32 may be activated by pressing the on/off button 53 of the LCD screen 52 (when temperature control apparatus 32 is not activated, barbeque 20 may operate as a conventional barbeque). Once activated, a desired temperature may be set by pressing the temperature area, such as zone control button 54 of the LCD screen 52. A set-point temperature may then be entered using up and down arrows 56 and 58 to increase or decrease the desired target temperature. The barbeque 20 may be configured to achieve a wide range of temperatures. For example, the barbeque 20 may be configured to achieve temperatures between 40 degrees C. and 200 degrees C., or 35 degrees C. to 300 degrees C., or 50 degrees C. to 350 degrees C., or to any suitable combination of temperature ranges.

In some cases, the barbeque 20 may also be purpose built for a very narrow temperature range such as between 200 and 300 degrees C. The temperature control apparatus 32 may be configured to achieve any range of temperatures depending on the barbeque 20 configuration.

Once a desired temperature is set, microprocessor 36 compares a signal received from thermocouple 32. The signal indicates the temperature in the vicinity of thermocouple 42. If the temperature conveyed by thermocouple 42 is within a given range of the set-point temperature, then nothing is done by microprocessor 36. The range within which the temperature conveyed by thermocouple 42 may differ from the desired set-point may be as low as a fraction (for example, 0.1 of a degree) or as large as one or more degrees, including plus or minus 5 degrees or 10 degree (either Celsius or Fahrenheit). Improved accuracy may be obtained by reducing the range by which the temperature conveyed by thermocouple 42 may differ from the desired temperature set via input device 34.

The range of variation relative to the desired temperature may have a first or lower threshold value, and a second or upper threshold value. While the difference between the lower and upper threshold values may be small, in order to more closely achieve the desired temperature, a small difference in these values may cause the valves, and possibly other components to operate more frequently. This frequent operation may reduce the effective lifetime of such components. Such frequent use may also increase the power consumption, which may be undesirable if there is a limited or restricted power supply. While a greater difference between upper and lower threshold values may produce greater variation in the actual temperature of the barbeque 20, less energy may be used and a longer life may be obtained from at least some of the components of barbeque 20.

For example, a lower/upper difference of 10 degrees F. (i.e., plus or minus 5 degrees F. about the desired temperature) may provide suitable results. Alternatively, ranges as small as 1 degrees F. or as large as 50 degrees F. (or larger depending on the cooking needs) may be suitable.

The upper and lower limits for the range may be static relative to the temperature set-point. For example, they may be set to always be within 5 degrees F. of the desired temperature. Alternatively, the upper and lower set-points may vary depending of the temperature set-point. For example, the upper and lower limits may be within 10 degrees F. of the desired temperature at a lower temperature such as 40 degrees F., whereas they may define a smaller range, for example, plus or minus 3 degrees F., relative to a higher set-point temperature, such as 200 degrees F.

This dynamic variation of upper and lower set-points may be used advantageously to take advantage of the thermal dynamic characteristics of the barbeque 20.

When microprocessor 36 receives a signal from thermocouple 42 indicating a temperature greater than (or optionally, equal to) an upper limit value, microprocessor 36 sends a signal to valve 38 to cause it to enter a low or no-flow state.

In some embodiments, valve 38 enters a low-flow state. Microprocessor 36 compares temperature information from thermocouple 42 and compares it with the upper and lower limits at some particular interval (e.g., as frequently as once per second, or fraction of a second, or as infrequently as every several minutes). The typical range for this comparison may be between 0 to 30 seconds. This provides sufficient time for a change in the temperature of the barbeque 20 to at least partially stabilize after a change in the state of valve 38.

When microprocessor 36 determines that the temperature conveyed by thermocouple 42 has fallen below a lower threshold (or alternatively, is equal to a lower threshold), then it may signal valve 38 to turn on or to switch to a high-flow state. This may cause the temperature within barbeque 20 to increase above the lower threshold.

Microprocessor 36 may continue to receive signals from thermocouple 42, and to cycle valve 38 between high and low (or, in some embodiments, between high and off) states to achieve a desired temperature within barbeque 20.

For example, when microprocessor 36 compares the temperature of thermocouple 42 against the lower and upper temperature thresholds every 5 seconds, and the upper and lower threshold values are separated by a range of 10 degrees F., the temperature within barbeque 20, having a closed lid 22, has been found to be maintainable within as little as one or two degrees Fahrenheit of the desired temperature.

In some examples, a safety feature may be included in the temperature control apparatus 32. Microprocessor 36 may include a memory (not shown), if needed, for example, for storing historical temperature data. In an embodiment, at least the previous reading from thermocouple 42 may be stored for comparison with a subsequent reading. If a difference between the previous and subsequent readings relative to the time between readings is within a certain range (i.e., is sufficiently great or sufficiently small), then an alarm may sound or another alert may be generated (for example and automated message could be sent to a user device).

Furthermore, if the differences between the previous and subsequent temperatures is great enough, microprocessor 36 may signal valve 38 to change into an off or low-flow state. This may occur, for example, if there is a flare-up or fire within the barbeque 20, causing a rapid increase in the temperature therein. Alternatively, if there is a rapid decrease in temperature, then the flame may have gone out and the flow of fuel may need to be shut off or reduced. In either case, an alarm may sound or another alert may be generated to notify the user to a possible error condition.

In some examples, more than one thermocouple may be employed within a single barbeque assembly 20. In such cases, microprocessor 36 may use data from the various thermocouples (such as by taking an average or weighted reading of the various thermocouples) to determine an actual current temperature of the barbeque 20.

Alternatively, barbeque 20 may be divided into two or more zones (or additional barbeques may be connected to temperature control apparatus 32), with at least one thermocouple being placed in each zone or barbeque.

When temperature control apparatus 32 is connected to thermocouples in two or more different zones of barbeque 22, different temperature states may be achieved within barbeque 20. For example, a desired temperature may be set for a second thermocouple 44 in a manner similar to that set for a first thermocouple 42. Thermocouple 44 may be set at a temperature the same as, higher than, or lower than the zone in which thermocouple 42 is placed (for example, zones 1 and 2 are illustrated in FIG. 3).

In some cases, zones 1 and 2 may be thermally separated by a physical divider or they may simply represent different areas within barbeque 20. If zones 1 and 2 are not physically divided, then achieving significantly different temperatures between thermocouple 42 and thermocouple 44 may be more difficult. Nevertheless, barbeque 20 may include a generally warmer area and a generally less warm area.

When more than one zone or barbeque is to be controlled using the temperature control apparatus 32, then at least one additional (or integrated) valve assembly 60 may be used for each zone controlled by temperature control apparatus 32. Microprocessor 36 may then be configured to independently control each respective valve, such as 38 and 60, in response to temperatures encoded by thermocouples 32 and 44.

Temperature control apparatus 32 may also operate in conjunction with a thermocouple 46. In some cases, input device 34 may be used to enter a type of food being cooking (often a meat such as, pork, beef, chicken, or lamb) and a desired doneness e.g., well done, medium, medium-rare, or rare). Microprocessor 36 may then control the temperature of barbeque 20 employing one or both thermocouples 42, 44, to achieve a particular temperature to cook the meat to a desired doneness.

In some examples, temperature control apparatus 32 may additionally be connected to a tank level sensor 50 for determining the amount of fuel left in a connected fuel reservoir, such as a liquid propane tank 66. An icon, such as icon 67 may graphically or numerically illustrate the amount of fuel remaining. Microprocessor 36 may be connected to a tank level sensor (described below), and may be configured to shut off valves such as valve 38 when the tank is low or empty.

In some examples, the tank 66 may be provided with a regulator 68 for ensuring that the pressure of the fuel provided to barbeque 20 is at a relatively constant pressure, regardless of the flow setting of the valves (such as valve 38). Hence, even though valve 38 may be in a low-flow state, the pressure of the fuel transmitted therethrough to barbeque 20 may be at generally the same pressure as the fuel transmitted when valve 38 is in a high-flow state.

The valves, such as valve 38 and valve 60, may not include a regulator or have a regulator associated therewith. This may be advantageous because it may reduce the chance that a "flame-out" occurs within barbeque 20 due to insufficient fuel pressure. It may also reduce the cost of valves 38 and 60. Since fuel flow is not typically regulated by pressure, the valves need not include a regulator.

In some cases, a fuel pressure of about 11 inches water column (WC) may be employed for propane and about 7 inches WC for natural gas. This may vary depending on requirements and government or other regulations which may vary by jurisdiction.

Figure 5A:
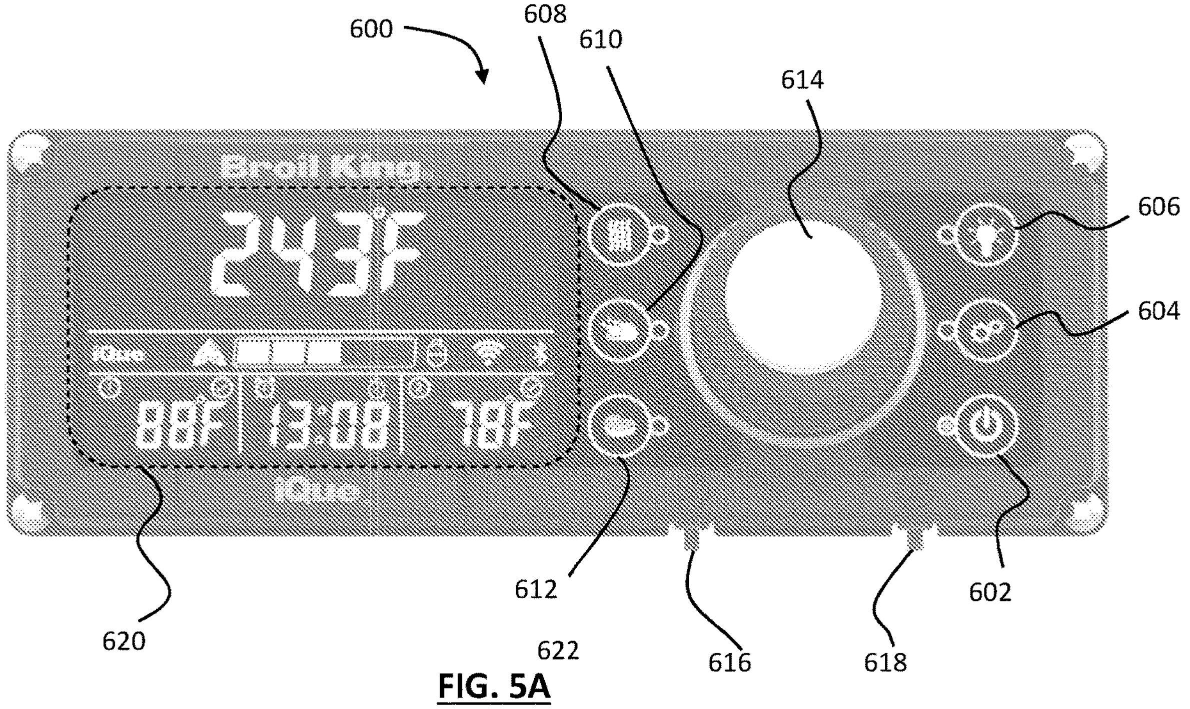
FIG. 5A is an image of an exemplary controller for use with a cooking apparatus such as the cooking apparatus of FIG. 1.
Figure 5B:
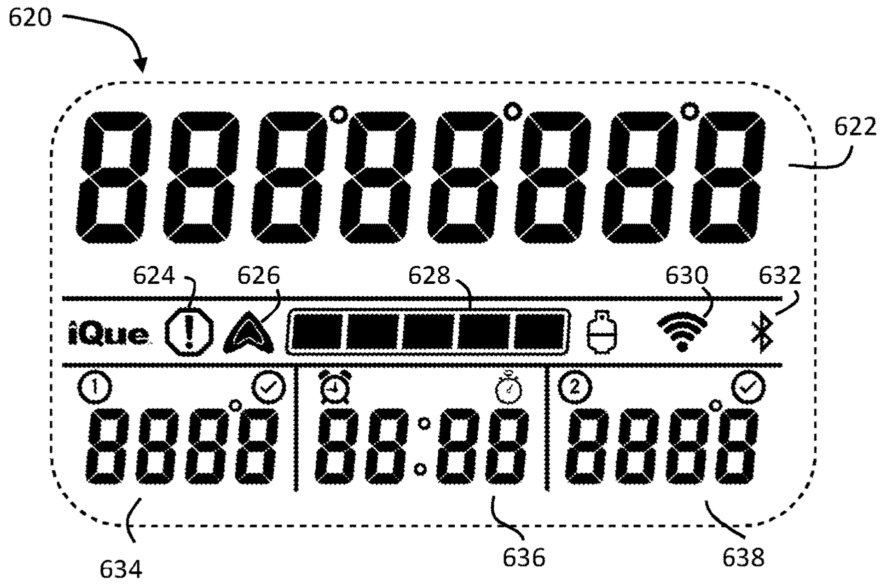
FIG. 5B is an image of a display screen of the controller of FIG. 5A.

Turning now to FIGS. 5A and 5B, illustrated therein is an example of a controller 600 according to another example. In this embodiment, the controller 600 includes several input devices and an output device. In particular, input devices can include buttons (which may be physical or touchscreen buttons, for example), such as a power button 602, a settings button 604, and an illumination or lights button 606 for activating one or more lighting elements, such as a light within the barbecue 20 and/or the knob lights, or the color of the knob lights.

For example, the controller 600 may be operable to adjust one or more lighting elements associated with one or more control knobs. The controller 600 may adjust the intensity and/or color of the lighting elements of the control knobs. For instance, when the cooking apparatus is warming up, a first color such as blue may be used to indicate that the cooking apparatus has not yet reached the desired cooking temperature. As the temperature of the cooking apparatus increases, the color may change (i.e., from blue to yellow, orange and then red once the desired temperature is reached).

The input devices may also include a buttons for selecting between different cooking modes, such as a smoke button 608 (e.g., for low temperature cooking), a roast button 610 (e.g. for medium temperature indirect heat cooking), and a grill button 612 (e.g., for high temperature direct heat cooking). The input devices of the controller 600 may also include a control knob 614 which may be used to control elements of the output devices, such as the display screen 620. The controller 600 may also include one or more input ports (such as port 616 and 618) for wired communication with one or more sensors, particularly temperature sensors.

Generally the input devices can be used to control operation of the controller 600 and in turn the barbecue 20. For example, selection of one of more buttons (e.g., smoke button 608, grill button 612, etc.) may activate one or more preset cooking routines (such as a temperature profile which may have been stored and which can be displayed on the display 620). In some cases the control knob 614 may be used to adjust a particular cooking parameter, such as the desired grill temperature.

More detail of the display 620 is shown in FIG. 5B. In particular, the display 620 can display the main temperature 622 of the barbecue 20 (which may be the actual current temperature of the barbecue 20 (or one or more zones thereof), and/or a desired temperature of the barbecue 20 (or one or more zones thereof).

The display 620 may also show other items of interest, such as a caution or alert 624 (e.g., when a large temperature spike or flare-up is detected), a solenoid status indicator 626 (which may indicate whether the solenoid is in a high-flow state, a low-flow state, or an off state), and a fuel gage 628 (which may cooperate with a tank scale and provide an estimate of the remaining amount of fuel).

The display 620 may also include some connectivity information, such as the status of wireless communication via Wi-Fi (630) and Bluetooth (632). The display 620 may also present additional information such as the measured temperature from one or more meat probes, namely first and second probe temperatures 634, 636, which may be measured via ports 616, 618. The display 620 may also include one or more timers 636.

Figure 6:
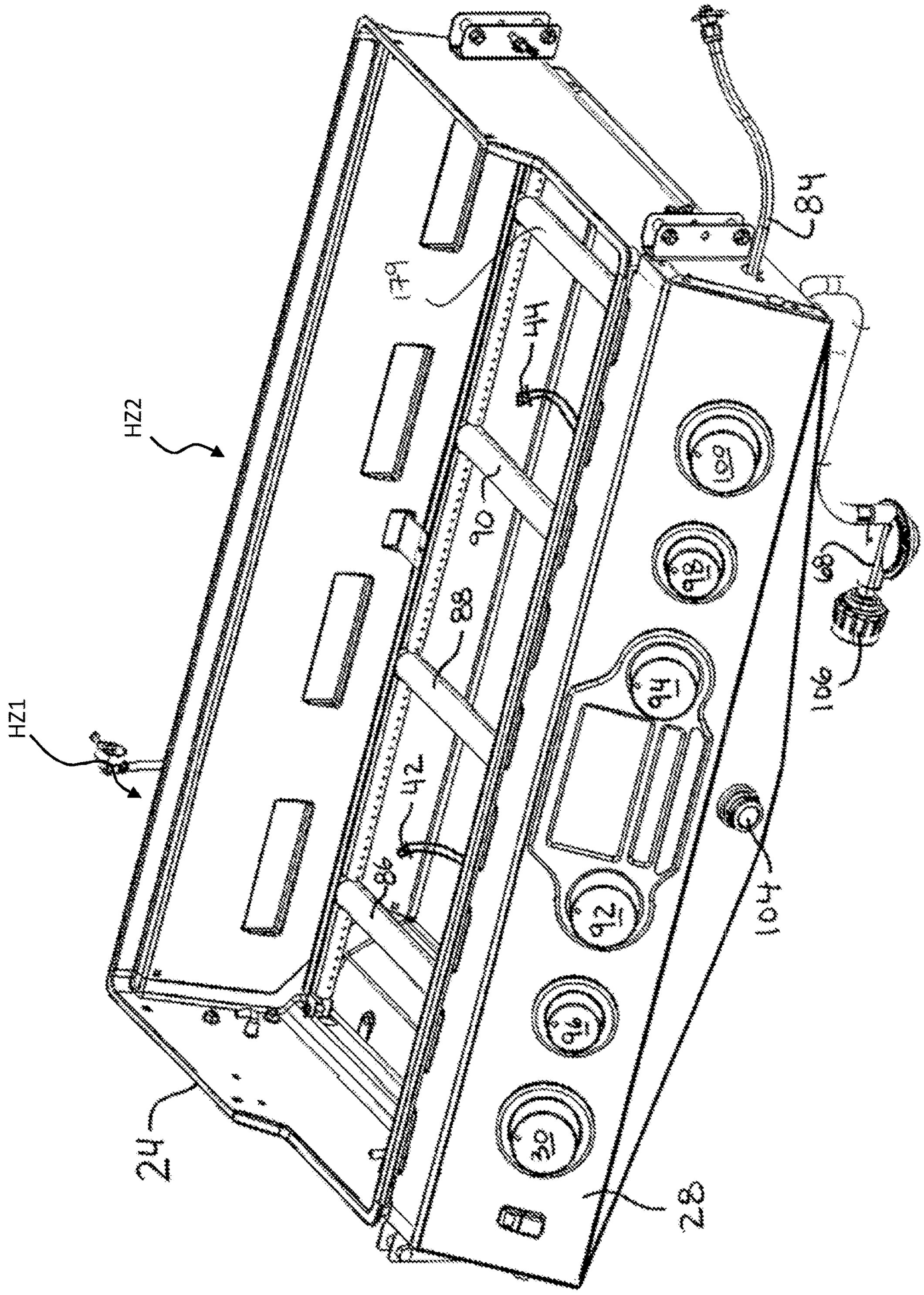
FIG. 6 is a perspective view of the cooking apparatus of FIG. 1 showing, burners and the temperature control apparatus.

Turning now to FIG. 6, illustrated therein is a detailed view of barbecue base 24 and console 28. FIG. 6 shows that the barbecue 20 may include an auxiliary burner (not shown in this figure) connected by conduit 84. The present embodiment may include three burners 86, 88 and 90.

Barbecue 20 may be configured to have any number of burners, including just one burner, or multiple burners. If just one burner is present, such as burner 86, or 88, then temperature control apparatus 32 will typically include just one valve assembly, such as valve assembly 38.

In some cases, each burner 86, 88 and 90 may define separate heating zones within barbecue 20. In such cases, barbecue 20 may be thermally separated into three different zones.

In the embodiment shown in FIG. 6, barbecue 20 includes two heating zones. For example, burners 86 and 88 may be associated with heating zone 1 (HZ1 on the left hand side) and burner 90 may be associated with heating zone 2 (HZ2 on the right hand side).

In some cases, HZ1 and HZ2 may be separated by a divider (discussed below) that is resistant to thermal transmission. This may help ensure that HZ1 and HZ2 may be controlled independently to have different temperatures, or they may be controlled relatively independently to have the same temperature.

Burners 86, 88 and 90 may have different configurations, or the same configuration, and they may include the burner types illustrated, or any other burner known in the art, including those conventionally used for gas fueled appliances, such as barbecues.

Figure 7:
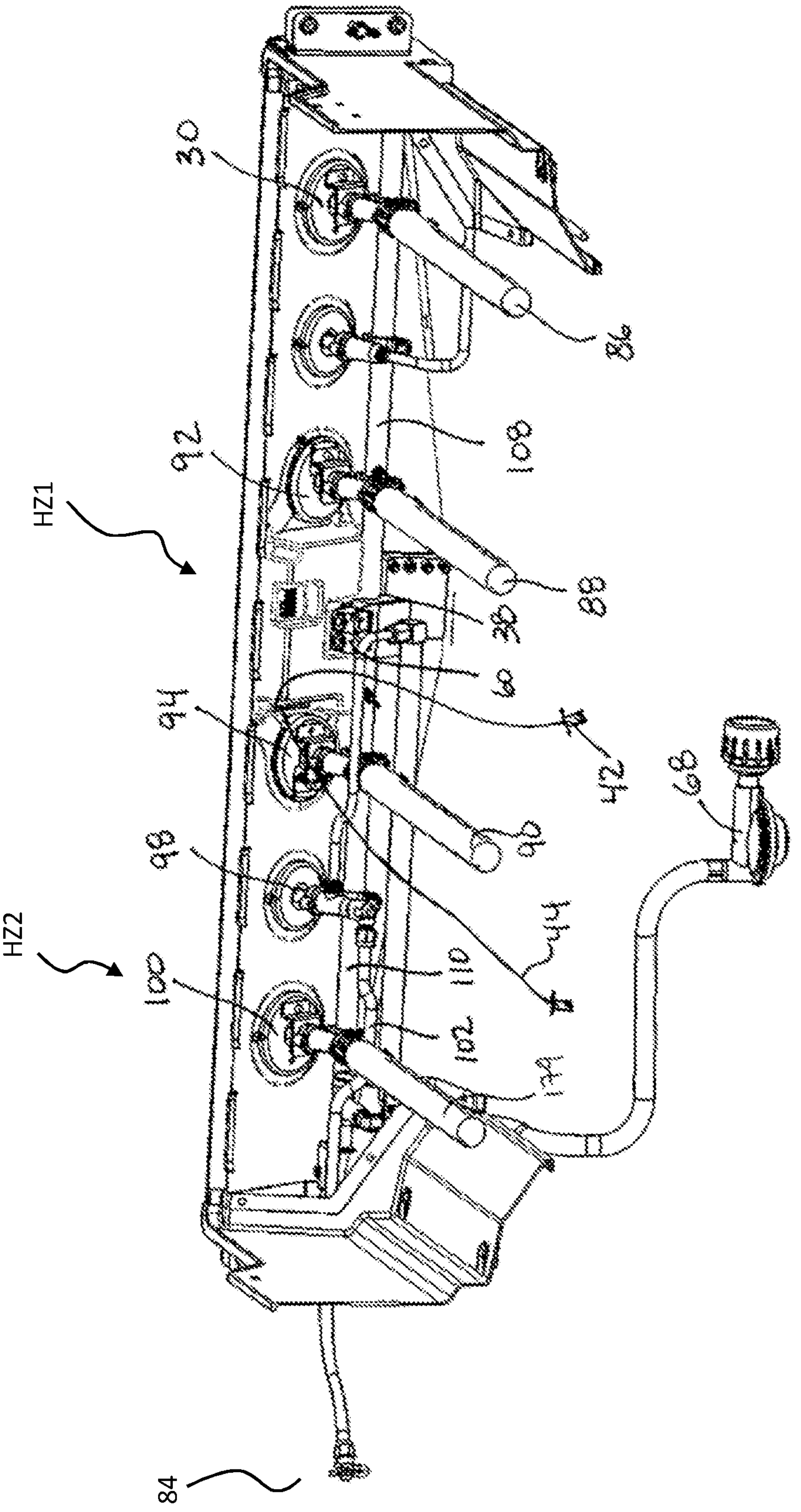
FIG. 7 is a partial rear view of the cooking apparatus of FIG. 6.

FIG. 7 illustrates an isolated rear view of console 28 and associated components of barbecue 20, including components of the temperature control apparatus 32.

When temperature control apparatus 32 is off or deactivated, control knobs 30, 92 and 94, each associated with a respective burner 86, 88 and 90, may be used to control the flow of a combustible fuel in a conventional manner. Each control knob typically if the differences between the previous and subsequent temperatures is great enough, microprocessor 36 may signal valve 38 to change into an off or low-flow state includes an associated valve.

Any suitable control knob and valve combination may be used, including those well known in the art. Additional control knobs may be included, such as control knobs 96 (e.g., for a rotisserie), 98 and 100. Control knob 98 may be used to control the flow of fuel to an additional burner or other appliance via conduit 102 which connects to conduit 84 (shown in FIG. 6).

Each valve, such as valve 38, associated with a zone may have a minimum flow rate that is similar to or equal to the sum of the flow rates of the associated controls, such as controls 30 and 92. For example, if controls 30 and 92 each have a minimum flow rate of 5,000 BTUs, then valve 38 may have a minimum flow rate of 10,000 BTUs (i.e., 5,000+5,000). This configuration may permit valve 38 to supply a minimum amount of fuel to controls 30 and 92.

If the minimum flow rate of valve 38 is made lower than the sum of the minimum flow rates of the associated control or controls, then it may be possible for any associated burner, such as burner 86 or 88 to “flame out” due to an insufficient fuel supply. In some cases, the minimum flow rate for valve 38 may be in the range of 10,000 BTUs, and the maximum flow rate may be in the range of 25,000 BTUs. Higher and lower values may also be suitable depending on the configuration such as the volume of the barbeque to be heated.

Control 30 may be configured to include an off position in which the flow of fuel to burner 86 is inhibited. The off position may be a discreet position. For example, control 30 may click or snap into an off position. Control 30 may also have discreet or continuous high and low positions, permitting high and low rates of fuel flow to burner 86.

In some embodiments embodiment, control 30 must be pushed when it is in an off position before it may be turned to a high or low position (i.e., a safety device may be present to inhibit inadvertently turning the gas on). Once in a high, low, or intermediate position, the control 30 may be released. Control 30 may then be rotated between high and low positions, without pushing it, to set a fuel flow rate that is high, low or at some intermediate position.

To return to an off position, in some examples control 30 may be pressed and turned to the off position. The other valves 92, 94, 96, 98 and 100 may be similarly configured.

In the illustrated embodiment, the controls, such as controls 30, 92 and 94, that are associated with the temperature control apparatus 32, may also be used at the time that the temperature control apparatus 32 is activated. For example, when control 30 is put to an intermediate flow position, temperature control apparatus 32 may operate valve 38 to cycle gas flow between the low flow rate of valve 38 and the intermediate flow rate as set by control 30.

If control 30 is placed to a high flow rate setting, then the temperature control apparatus 32 may operate to achieve and maintain temperatures within a broader range.

When temperature control apparatus 32 is used, all associated valves (30, 92 and 94, 100) may be placed by a user to a high flow position to provide the temperature control apparatus 32 with the largest possible range of operation.

Temperature control apparatus 32 may also operate if all control knobs (such as control 30) are eliminated. In such case, flow of the fuel may be turned off using a shut-off valve of a regulator or at the fuel supply (i.e., the shut-off valve on a typical propane cylinder).

In some cases, the control knobs may be connected via a manifold 108. When the temperature of more than one zone is to be controlled, then the controls and associated burners for a particular given zone may be connected via separate manifolds. In other cases, the same manifold may be used to control multiple zones.

In the present example, for instance, a second manifold 110 may be included for HZ2, as seen in FIG. 7. Manifold 108 may connect burners 86 and 88, and associated controls 30 and 92. Manifold 108 may also connect with valve 38. In this way, the temperature control apparatus 32 may separately control the burners in HZ1 via valve 38, and the burners in HZ2 via valve 60.

In some cases, temperature sensors such as thermocouples 42 and 44 may be located within each of HZ1 and HZ2. The thermocouples may be mounted to a side of base 24, or any other location. Thermocouples 42 and 44 are preferably placed to avoid contact with any drippings or splatter from food cooked within barbecue 20.

Barbecue assembly 20 may additionally include an igniter for igniting fuel communicated to the burners, such as burner 86. Alternatively, a lighter, match or other suitable means may be used to ignite the burners.

Figure 8A:
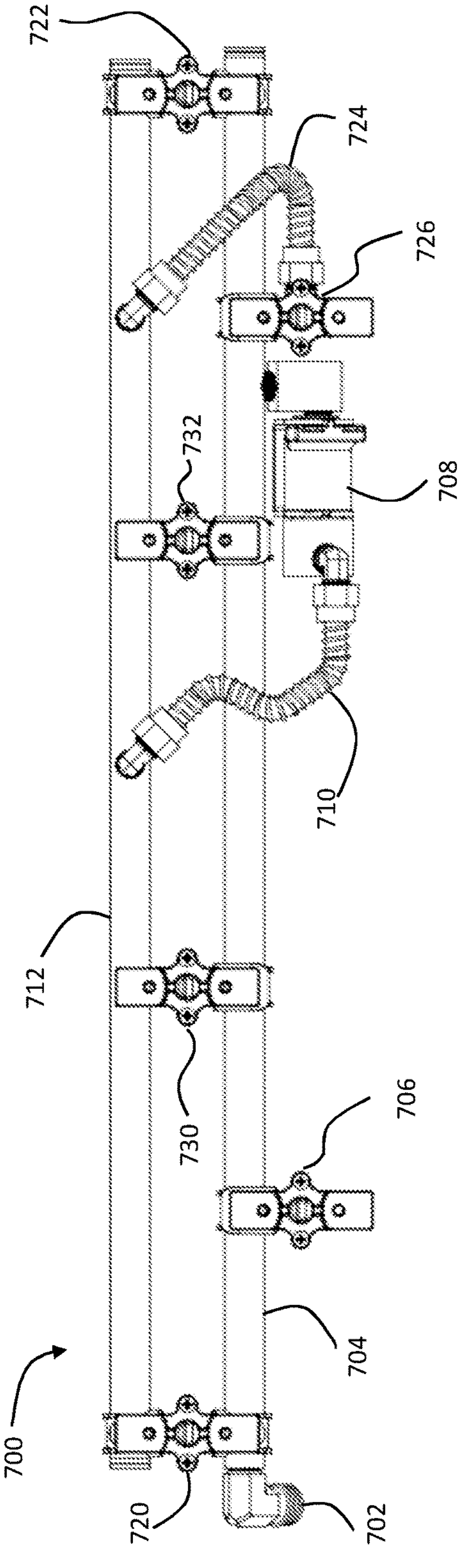
FIG. 8A is a front view of a burner assembly according to one exemplary embodiment.
Figure 8B:
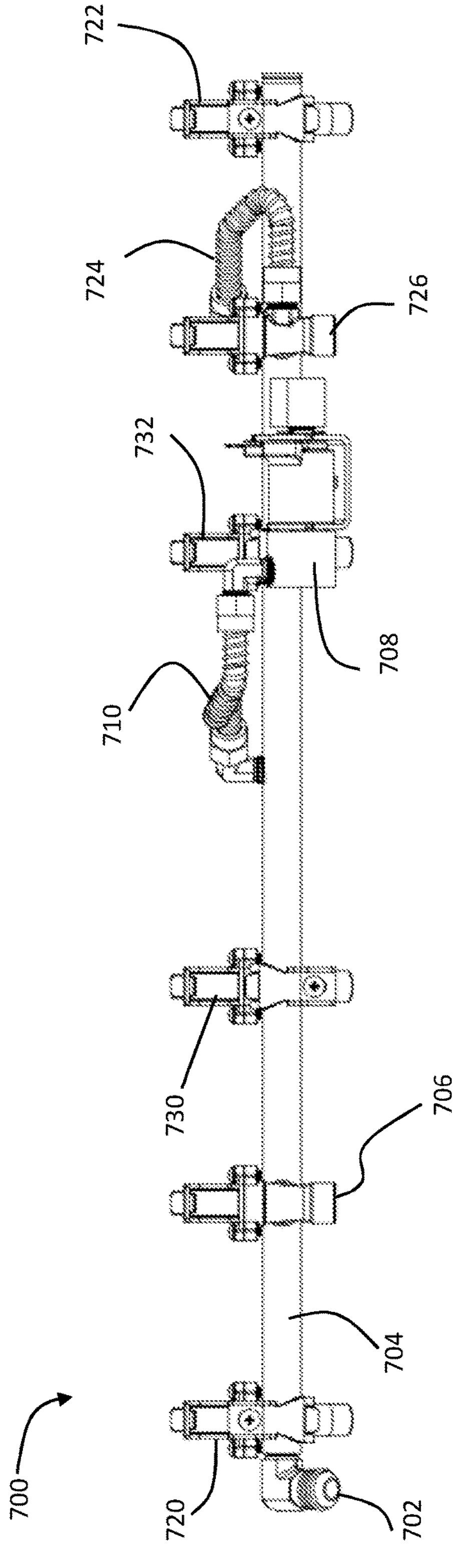
FIG. 8B is a bottom view of the burner assembly of FIG. 8A.
Figure 8C:
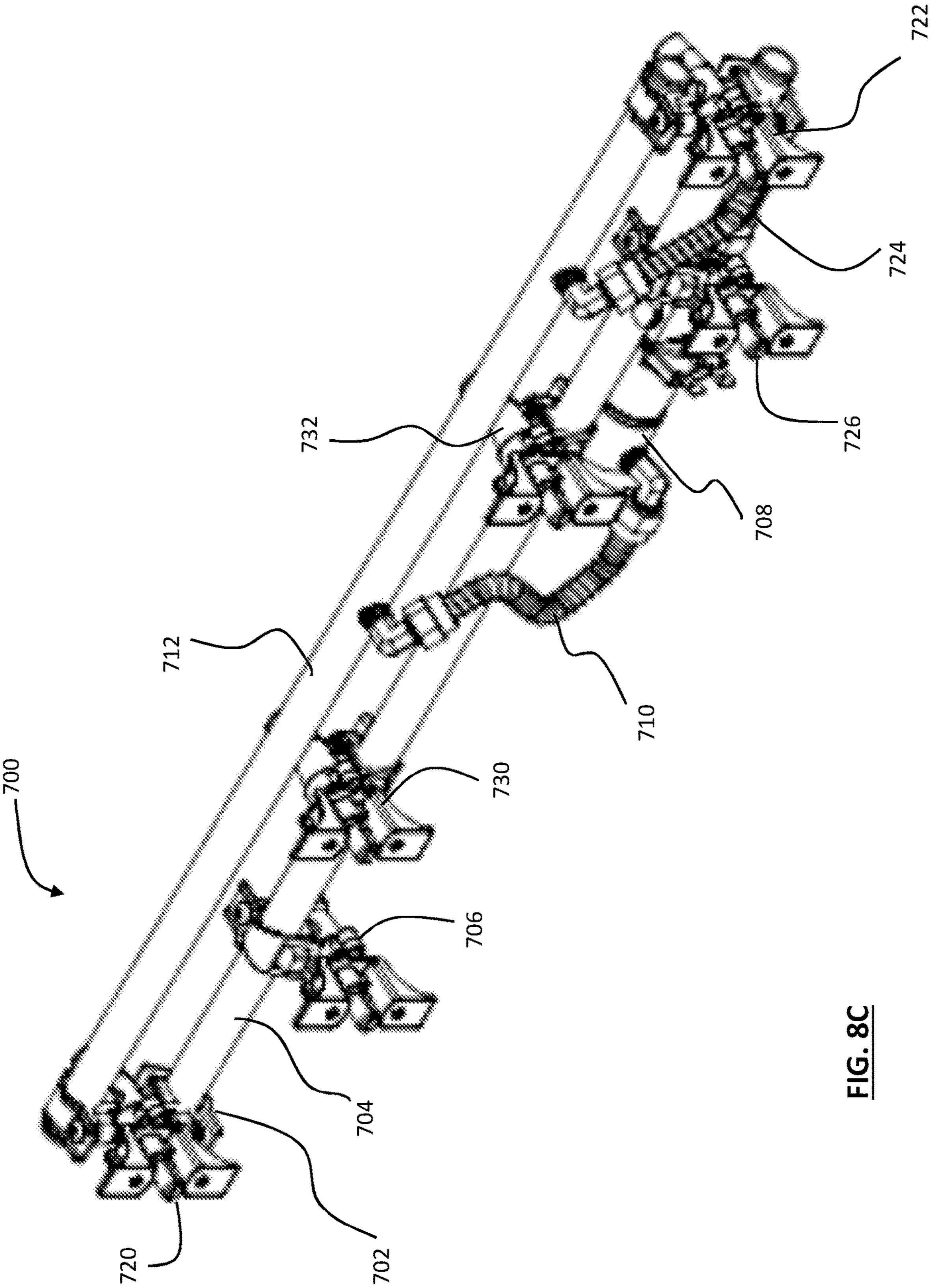
FIG. 8C is a front perspective view of the burner assembly of FIG. 8A.

Turning now to FIGS. 8A to 8C, illustrated therein is a burner assembly 700 according to another exemplary embodiment. In this example, the burner assembly uses one or more solenoid valves to control a subset of the burners in a cooking apparatus, such as barbecue 20, while other burners of the assembly 700 are manually controlled.

In particular, the burner assembly 700 includes a gas inlet to receive a gas (i.e., propane, natural gas, etc.) and which directly feeds a main fuel manifold 704. The main fuel manifold 704 supplies fuel to a first manual valve 706, which in this example is a side burner valve for manually controlling a side burner (i.e., a supplementary burner outside of the main cookbox of the barbecue 20) and the second and third manual valves 730 and 732 controlling the middle burners 830 and 832 as discussed further below, for example using a control knob (e.g., control knob 806 shown in FIG. 9A).

The main fuel manifold 704 also provides fuel to a control valve (i.e., solenoid 708) which is controlled by a controller, such as controller 600 shown in FIG. 5A.

In this embodiment, when the controller 600 is not actively controlling the temperature of the barbecue 20, the solenoid 708 is typically fully open to allow fuel from the main fuel manifold 704 to pass through the solenoid 708 and into a conduit 710, where it will flow to a controlled fuel manifold 712.

In particular, when the controller 600 is not actively adjusting the temperature of the cooking apparatus, the solenoid 708 typically allows fuel to flow unimpeded from the main fuel manifold 704 to the controlled fuel manifold 712.] However, when the controller 600 is active, the solenoid 708 may be at least partially closed to restrict the amount of fuel provided to the controlled fuel manifold 712.

For instance, as shown the controlled fuel manifold 712 includes controlled valves 720 and 722 which in turn supply controlled burners 820, 822 (as shown in FIGS. 9A to 9D). By restricting the fuel in the controlled fuel manifold 712, the solenoid 708 can decrease the fuel passing through the controlled valves 720, 722 and hence reduce the fuel provided to the controlled burners 820, 822. In turn, reducing the fuel amount provide to the controlled burners 820, 822 will reduce the heat input to the cooking apparatus, controlling the temperature.

It will be appreciated that controlled valves 720, 722 typically also include control knobs (e.g., control knobs 802, 804 for selectively opening the valves 720, 722 as well as for manually adjusting the valves 720, 722, such as when the solenoid 708 is inactive).

In some examples, as shown the controlled fuel manifold 712 may also supply a third controlled valve 726 via conduit 724. In this embodiment, the third controlled valve 726 may be a rear valve configured to control a rear burner, such as for rotisserie cooking. This third controlled valve 826 may be manually controlled via control knob 812 (as shown in FIG. 9A).

As also shown, the burner assembly 700 includes one or more manual valves 730, 732. Manual valves 730, 732 are supplied directly by the main fuel manifold 704, and hence in this example are not controlled by the solenoid 708. Manual valves 730, 732 will instead be controlled by control knob 808, 810, for example, as shown in FIG. 9A. These manual valves 730, 732 in turn supply fuel to manual burners 830, 832, which in this example are located towards the center of the grill. This allows food in the central region of the grill to be cooked, and may allow for different cooking operations as discussed in greater detail below.

In contrast, the controlled burners 820, 822 may be located toward the periphery of the cooking apparatus (i.e., towards the outer regions thereof). In such cases, the controller burners 820, 822 may be used to indirectly control the heat of food items placed, for example, in a central region of the cooking apparatus (i.e., above the manual burners 830, 832 for instance).

Figure 9A:
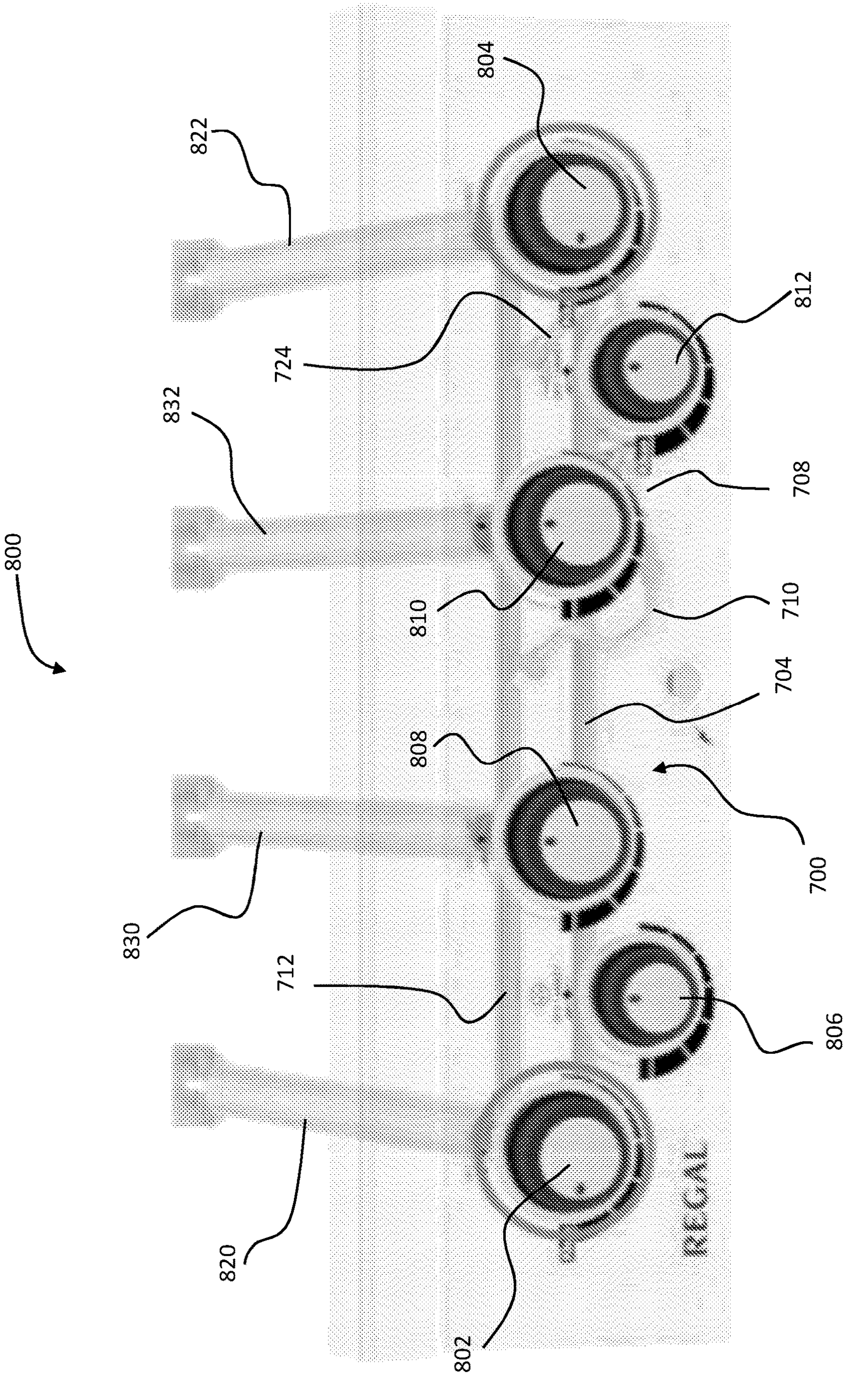
FIGS. 9A to 9D illustrate several exemplary use cases of the burner assembly of FIGS. 8A to 8C.

Turning now more specifically to FIGS. 9A to 9D, illustrated therein are several exemplary use cases. In some examples, certain types of cooking such as smoking or slow roasting by indirect heat at temperatures ranging from 225 degrees F. to 400 degrees F. can be achieved by setting the valves as illustrated in FIG. 9A.

In particular, FIG. 9A shows the burner assembly 800 configured to provide a desired temperature range of between about 225 to 400 degrees F. For instance, a user may desire to preheat the barbecue to a particular temperature in that range (say 250 degrees F.) to slowly cook some meat, and may use the controller 600 to set the desired set-point temperature.

In this embodiment, the control knobs 802, 804 have been manually turned to fully open (by the user), while the manual control knobs 808, 810 are fully closed (and hence the manual burners 830, 832 are inactive). Initially the solenoid 708 will be fully open and the controlled burners 820, 822 will be on high.

As the barbecue heats up, the controller 600 will monitor the temperature of the cookbox within the barbecue 20 (for example using one or more thermocouples). As the temperature increases, the controller 600 may adjust the fuel flow rate via the solenoid 708 to achieve the desired temperature. More particularly, once the barbecue 20 has reached the desired temperature (say 250 degrees F.), the solenoid 708 restricts the fuel rate to reduce the controller burners 830, 832 to a low flame and maintain the desired heat.

Figure 9B:
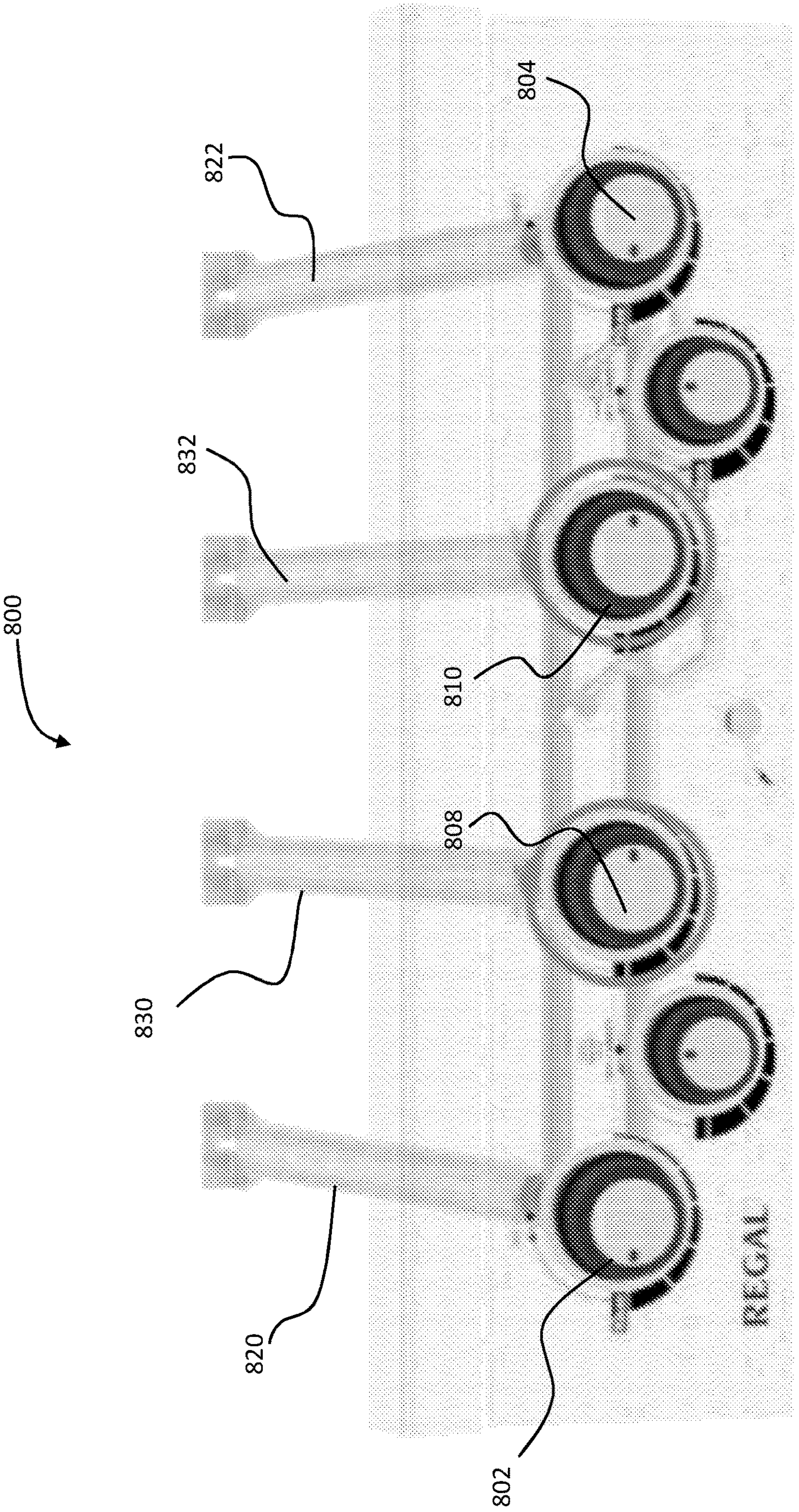

Smoking or roasting with higher indirect heat at temperatures ranging from 400 degrees F. to 500 degrees F. (for example) can be achieved by setting the valves as illustrated in FIG. 9B. In particular, as shown in this example the controller 600 has been set to a higher temperature of between about 400 degrees F. to 500 degrees F. (say 450 degrees F.). This may be for roasting, for example, without higher indirect heat.

To achieve this temperature, the user can manually activate the manual control knobs 808, 810 to put the manual burners 830, 832 in a low heat state (i.e., a low fluid flow state). The solenoid 708 on the other hand can be used to activate the controlled burners 820, 822 into a high heat state to as to quickly reach a desired temperature. In this example, food placed in the centre of the grill will be located above the low-temperature manual burners 830, 832, while the outer controlled burners 820, 822 can be used to provide desired indirect heat.

Figure 9C:
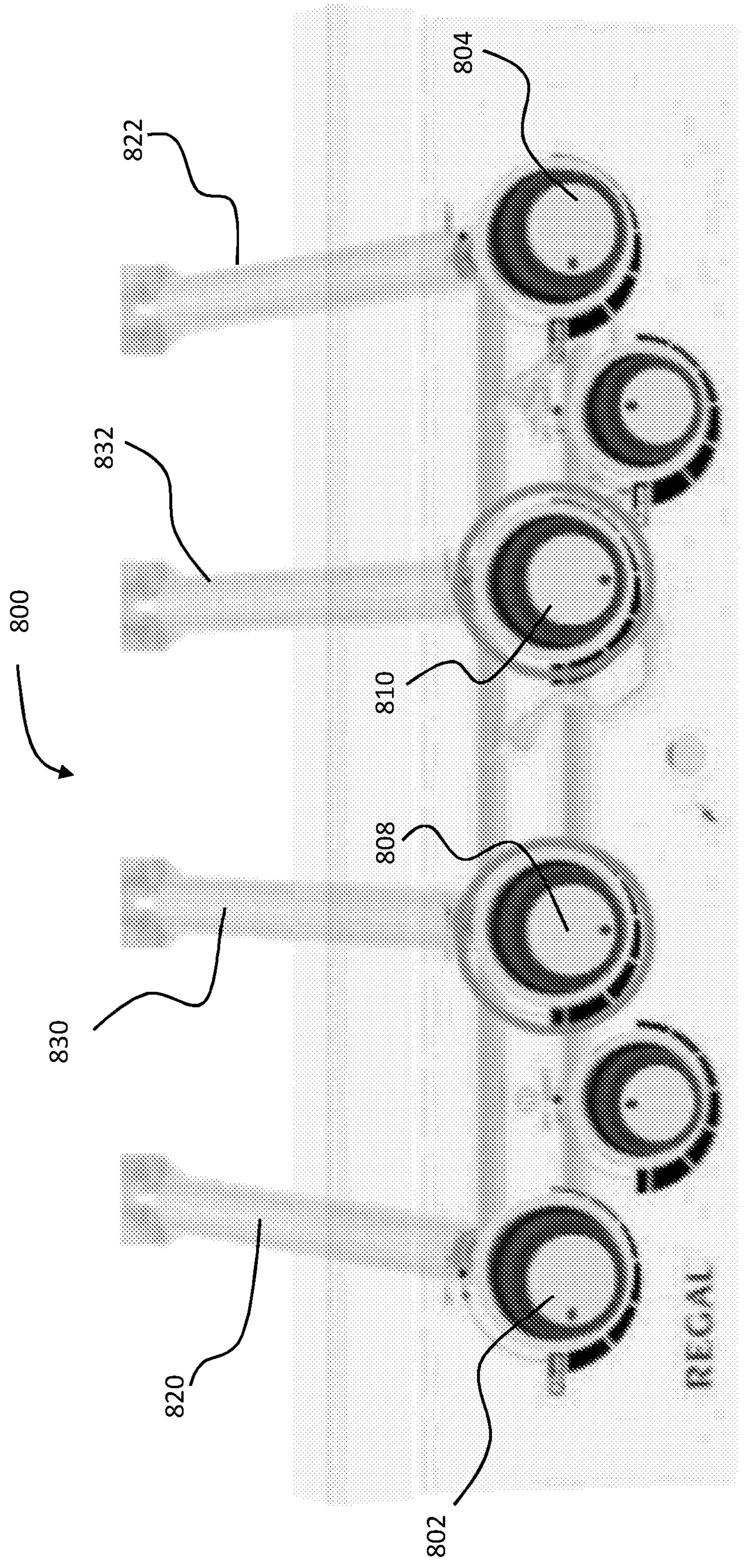

Grilling and searing with high direct heat at temperatures ranging from 500 degrees F. to 700 degrees F. (for example) can be achieved by setting the middle valves on medium as illustrated in FIG. 9C. In particular, in this example the burner assembly 800 is being used for a grilling operation. The controller may have been set for a very high temperature of between 500 and 650 degrees F. (say 600 degrees F., for example).

To achieve this temperature, the manual control knobs 808, 810 will be used to set the manual burners 830, 832 on a medium heat level (i.e., with a medium flow rate of gas). The control knobs 802, 804 can be manually set fully open, while the controller 600 can then use the solenoid 708 to control gas flow to the controlled burners 820, 822 to first achieve and then maintain the desired temperature. In this manner the user can achieve a desired temperature for grilling without having to adjust the control knobs 802, 804, 808, 810.

Figure 9D:
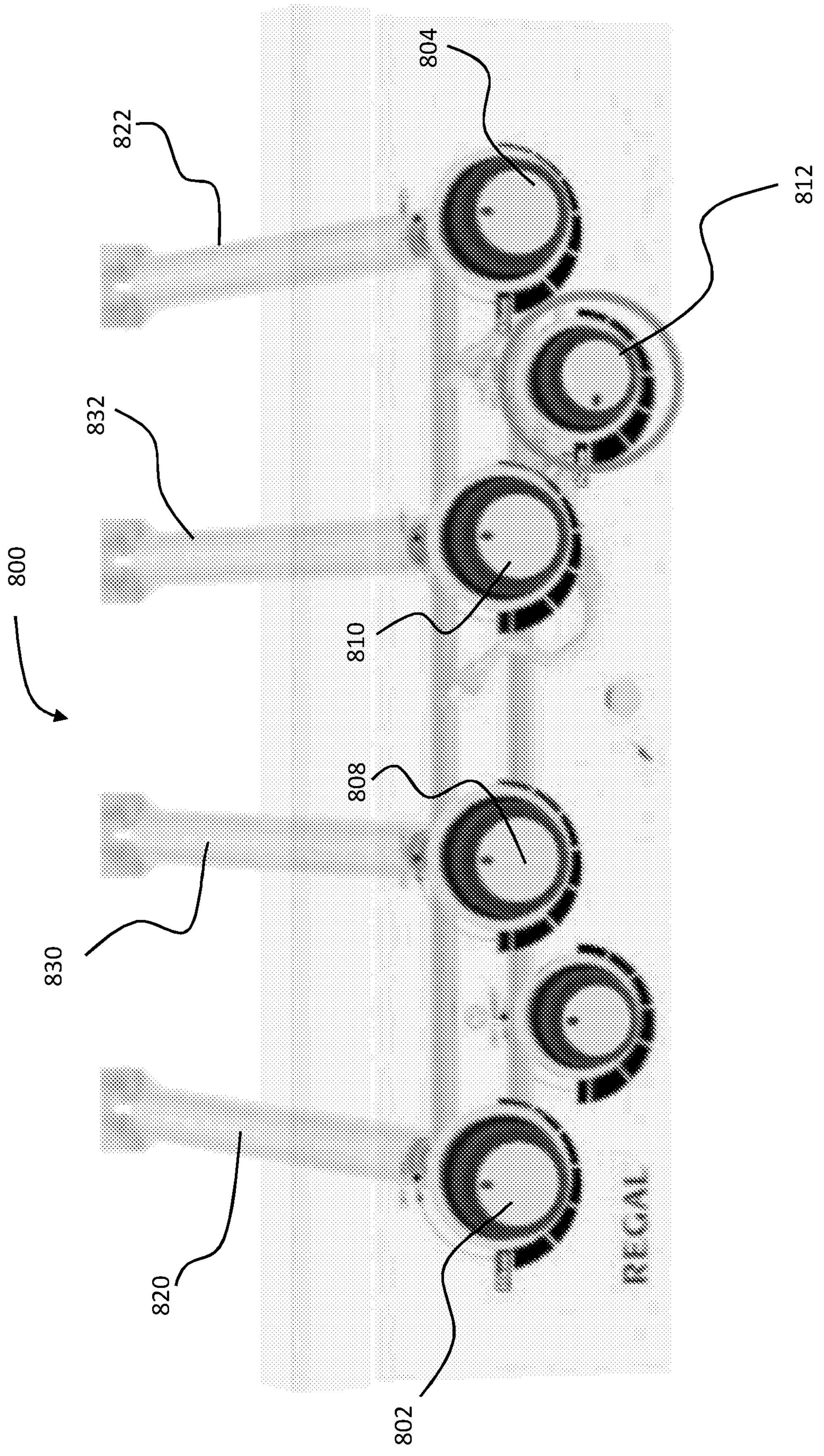

Lastly, FIG. 9D shows the use of the burner assembly 800 in a rotisserie mode, for example at a temperature range of about 225 to 375 degrees F. This may be suitable for cooking a rotisserie style chicken, pork, lamb, or beef for instance.

In this embodiment, control knobs 802, 804, 808, and 810 are all off and no fuel is provided to the burners 820, 822, 830, 832. The rear control knob 812 has been manually set to fully open, while the controller 600 uses the solenoid 708 to achieve and then maintain the desired temperature for rotisserie cooking.

Figure 10:
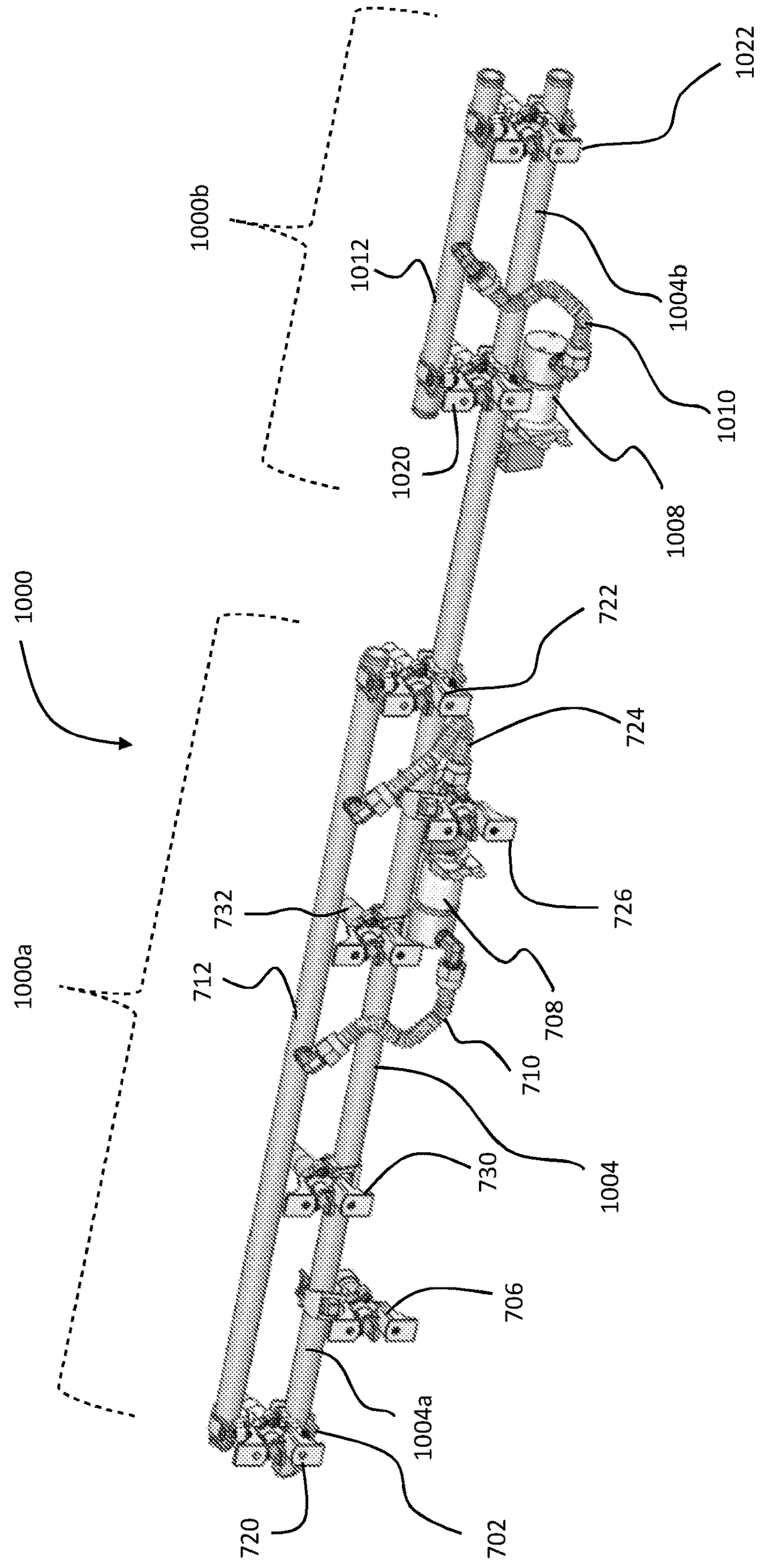
FIG. 10 is a front perspective view of a burner assembly according to another exemplary embodiment.

Turning now to FIG. 10, illustrated therein is a burner assembly 1000 according to another exemplary embodiment. This burner assembly 1000 is generally similar to burner assembly 700, but also includes additional features. In particular, burner assembly 1000 includes a first region 1000*a* that generally functions like burner assembly 700, and a second region 1000*b* that provides additional functionality. In some cases, the first region 1000*a* may be in a first cookbox or second region of a cooking apparatus, while the second region 1000*b* may be in a second cookbox or second region of the cooking apparatus.

First region 1000*a* of the burner assembly 1000 includes a main fuel manifold 1004 with a first portion 1004*a* proximate the gas inlet 702 that functions like main fuel manifold 704. In particular, the first portion 1004*a* of the main fuel manifold 1004 provides fuel to the first manual valve 706, the control valve 708 (i.e., solenoid), and so on generally as described above with respect to burner assembly 700.

The second portion 1004*b* provides fuel to the second region 1000*b*, and in particular, to a second control valve 1008. The second control valve 1008 selectively provides fuel through a second conduit 1010 to a second controlled fuel manifold 1012, for instance in response to control signals from the controller 600. The second controlled fuel manifold 1012 in turn provides fuel to additional controlled valves 1020, 1022, which provide fuel to additional controlled burners (not shown).

The burner assembly 1000 shown in FIG. 10 may be particularly suitable for use with a cooking apparatus having two cooking regions or indeed two cookboxes. The use of two different control valves 708, 1008 may allow the different regions or cookboxes of the cooking apparatus to be set at different temperatures (e.g., using the controller 600 to set two different set-points in different locations of the cooking apparatus). For example, a first cookbox (i.e., with region 1000*a*) could be used for roasting, while a second cookbox (i.e., with region 1000*b*) could be used for grilling at a higher temperature.

Figure 11:
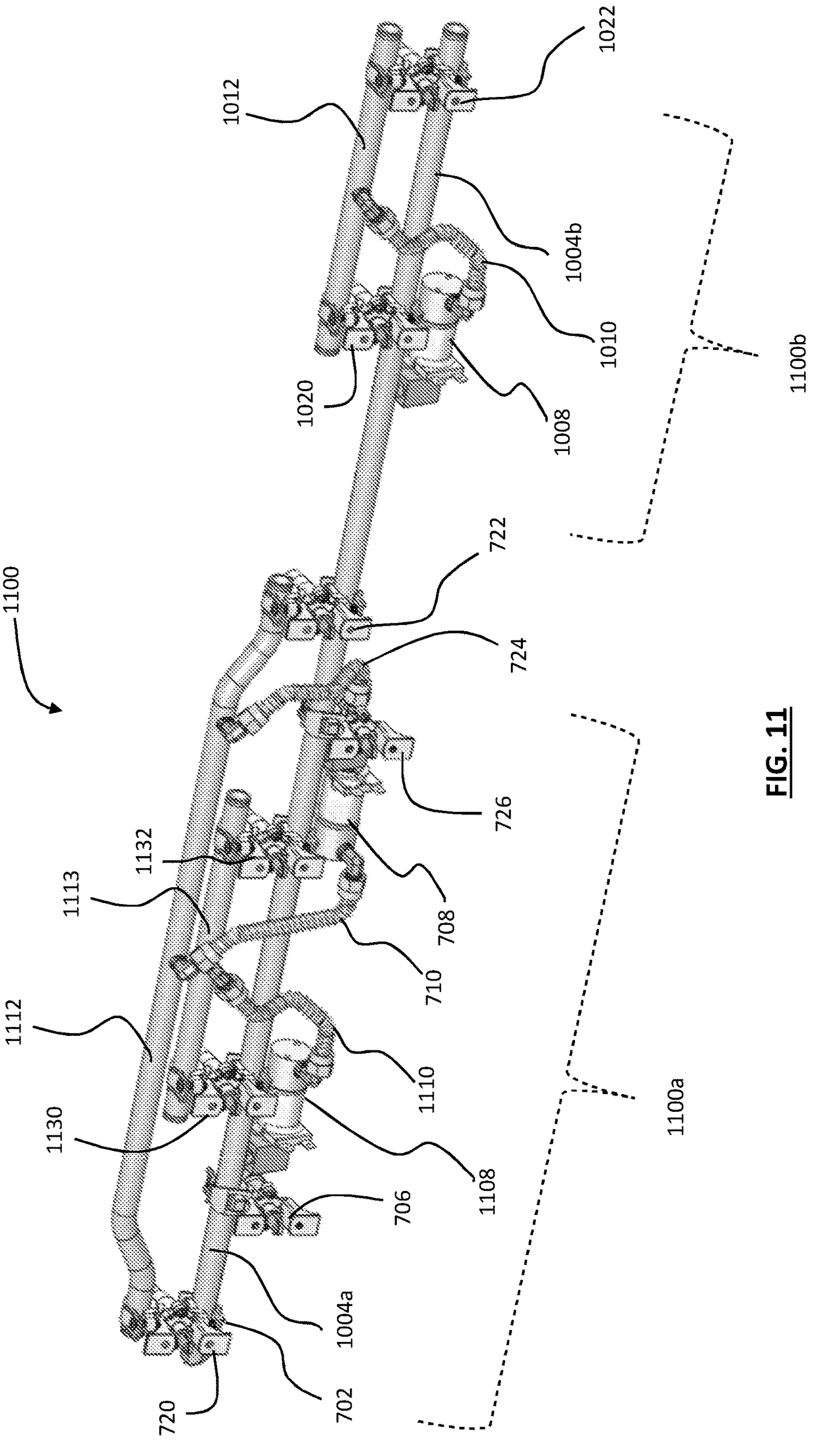
FIG. 11 is a front perspective view of a burner assembly according to another exemplary embodiment.

Turning now to FIG. 11, illustrated therein is a burner assembly 1100 according to another exemplary embodiment. This embodiment is similar to burner assembly 1000 shown in FIG. 10, and also includes two regions, first region 1100*a* (similar to region 1000*a*) and second region 1100*b* (similar to region 1000*b*).

In this embodiment, however, the first region 1100*a* includes another control valve 1108 (i.e., a third control valve) that is in fluid communication with the first portion 1004*a* of the main fuel manifold 1004. This control valve 1108 can be used to selectively provide fuel to a third controlled manifold 1113 (such as via conduit 1110). This third controlled manifold 1113 in turn provides fuel to controlled valves 1130, 1132 (which are in turn coupled to additional controlled burners, not shown).

The second controlled manifold 1112 in this example, on the other hand, has a slightly bowed shape to accommodate the manifold 1113, while still providing fuel to the controlled valves 720, 722.

In this manner, the burner assembly 1110 provides control of control of valves 1130, 1132, in addition to valves 720, 722, and 726 in the first region 1110*a*. This embodiment may be desirable when more control over the operation of the cooking apparatus is required.

Figure 12:
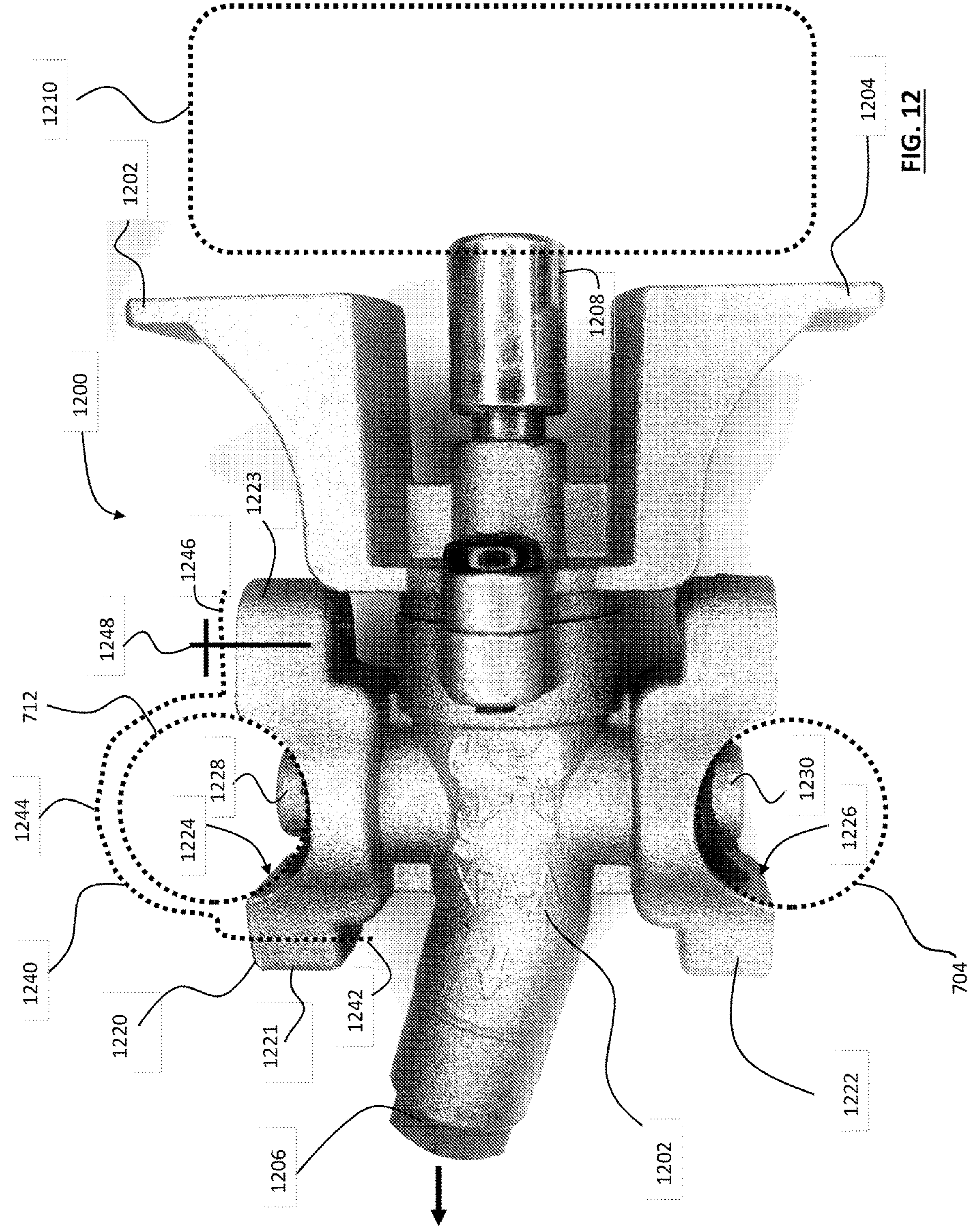
FIG. 12 is a side view of a valve of a manual valve according to one exemplary embodiment.

Turning now to FIG. 12, illustrated therein is a side view of an exemplary manual valve 1200 according to one embodiment. In order to provide for a compact assembly of the burner assemblies, and in particular to more accurately align the various manifolds, the manual valve 1200 is designed to support the manifolds.

In particular, in this example the valve 1200 includes a main valve body 1202. Extending forwardly of the main valve body 1202 (i.e., towards the front of the cooking apparatus) are mounting elements 1202, 1204, which are typically flanges that are sized and shaped to mount the manual valve 1200 to the cookbox of a cooking apparatus. In particular, the mounting elements 1202, 1204 may have threaded holes and be secured to a cookbox using machine screws, bolts or the like.

Positioned between the mounting elements 1202, 1204 is an adjustable valve stem 1208 that is operable to engage with a manual control knob 1210 shown schematically. As a user rotates the control knob 1210, the valve stem 1208 will rotate to selectively open and close fluid flow through the valve body 1202.

The valve 1200 also includes a pair opposing flanges 1220, 1222 or "ears" that extend upwardly and downwardly (respectively). The flanges 1220, 1222 including curved inner surfaces 1224, 1226 that are sized and shaped to engage with and support the manifolds, which in this example are main fuel manifold 704 and controlled manifold 712 shown schematically. In some cases, a gasket (i.e., made of rubber or other compressible material) may be positioned between each of the inner surfaces 1224, 1226 and the manifolds 712, 704.

Each of the flanges 1220, 1222 includes a post 1228, 1230 that extends outwardly from the inner surfaces 1224, 1226. Each post 1228, 1230 is sized and shaped to securely engage with a corresponding hole in the manifolds 712, 704. These holes provide for positive locating of the manifolds 712, 704, ensuring the manifolds 712, 704 are properly aligned.

In particular, a clip 1240 (shown schematically) may be used to secure each manifold 712, 704 to the flanges 1220, 1222. For example, as shown clip 1240 may have a first end 1242 that hooks onto a first portion 1221 of the flange 1220. The clip 1240 may also have a portion 1244 that wraps around the outer perimeter of the manifold 712. The clip 1240 may also have a tab 1246 that engages with a second portion 1223 of the flange, for example using a machine screw 1248. The flange 1222, clip 1240, manifold 712, and gasket are sized and shaped such that tightening the screw 1248 securely engages the manifold 712 to the flange 1220, and generally provides a leak proof seal therebetween.

In particular, in this embodiment the post 1228 has a passageway that is designed to be in fluid communication with gas coming from the manifold 712. Meaning that fuel is the manifold 712 will pass into the post 1228 and (when valve stem 1208 is open) the fuel will pass through the valve body 1202 and out a gas outlet 1206 (located rearwardly of the valve 1200) and then into a burner (not shown).

On the other hand, the other post 1230 of the valve is generally solid or at least blocked such that it does not permit gas in the other manifold 704 to flow into the valve body 1202 and out the gas outlet 1206.

The size and shape of the valve 1200 generally allows to both strong and precise mechanical support of the manifolds, while providing the desired control of fuel therethrough.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples but should be given the broadest interpretation consistent with the description as a whole.

The invention claimed is:

1. A cooking apparatus, comprising:
   a. a main fuel manifold that provides fuel to at least one manual burner and at least one control valve;
   b. at least one controlled fuel manifold in fluid communication with the at least one control valve, each controlled fuel manifold for providing fuel to at least one controlled burner;
   c. at least one sensor, each sensor monitoring at least one measured temperature within the cooking apparatus;
   d. a controller operable to receive a desired temperature set-point, the controller comprising a microprocessor operable to compare the at least one measured temperature and the temperature set-point, and in response to the comparison selectively adjust the at least one control valve to restrict an amount of fuel flowing to the at least one controlled fuel manifold; and
   e. a plurality of burner valves, each burner valve coupled to a burner to supply fuel to the burner from one of the controlled fuel manifold and the main fuel manifold, and wherein the plurality of burner valves includes at least one burner valve shaped to support both the controlled fuel manifold and the main fuel manifold, the at least one burner valve including:
   a controlled fuel manifold support forming a first curved inner surface sized and shaped to engage with the controlled fuel manifold, and
   a main fuel manifold support forming a second curved inner surface sized and shaped to engage with the main fuel manifold.

2. The cooking apparatus of claim 1, wherein at least one of the manual burners are located centrally of the cooking apparatus.

3. The cooking apparatus of claim 1, wherein at least one of the controlled burners are located towards a periphery of the cooking apparatus.

4. The cooking apparatus of claim 1, wherein the at least one control valve includes a first control valve in fluid communication with a first controlled fuel manifold, and a second control valve in fluid communication with a second controlled fuel manifold.

5. The cooking apparatus of claim 4, further comprising a third control valve in fluid communication with a third controlled fuel manifold.

6. The cooking apparatus of claim 5, further comprising at least one control knob for manually controlling fuel to at least one of the manual burners.

7. The cooking apparatus of claim 1, further comprising at least one control knob for manually controlling fuel to at least one of the controlled burners.

8. The cooking apparatus of claim 1, wherein the at least one manual burner includes a side burner.

9. The cooking apparatus of claim 1, wherein the at least one controlled burner includes a rear burner.

10. The cooking apparatus of claim 1, wherein the at least one controlled fuel manifold and main fuel manifold are mounted to the at least one burner valve shaped to support both the controlled fuel manifold and the main fuel manifold.

11. The cooking apparatus of claim 10, wherein the at least one burner valve shaped to support both the controlled fuel manifold and the main fuel manifold includes a first burner valve shaped to support both the controlled fuel manifold and the main fuel manifold supporting the controlled fuel manifold and main fuel manifold toward a first end thereof, and a second burner valve shaped to support both the controlled fuel manifold and the main fuel manifold supporting the controlled fuel manifold and main fuel manifold toward a second end thereof.

12. The cooking apparatus of claim 1, wherein at least one of the controlled fuel manifold support and the main fuel manifold support includes a post sized and shaped to be received in a hole in a corresponding manifold.

13. The cooking apparatus of claim 12, wherein the at least one burner valve shaped to support both the controlled fuel manifold and the main fuel manifold further comprises a gasket positioned between each of the at least one of the controlled fuel manifold support and the main fuel manifold support and the outer surface of the corresponding manifold.

14. The cooking apparatus of claim 12, further comprising at least one clip for securing each of the at least one of the controlled fuel manifold support and the main fuel manifold support to the corresponding manifold.

15. The cooking apparatus of claim 1, wherein the sensor is a thermocouple.

16. The cooking apparatus of claim 1, wherein the temperature set-point is a first temperature set-point, and the controller is operable to receive a second temperature set-point.

17. The cooking apparatus of claim 16, wherein the first temperature set-point and second temperature set-point are for different heating zones of the cooking apparatus.

18. The cooking apparatus of claim 17, wherein the different heating zones comprise a first cookbox and a second cookbox.

* * * * *